United States Patent
Bando

(10) Patent No.: US 7,804,528 B2
(45) Date of Patent: Sep. 28, 2010

(54) INFORMATION PROCESSING APPARATUS AND METHOD, AND PROGRAM STORAGE MEDIUM

(75) Inventor: Hiroyuki Bando, Kanagawa (JP)

(73) Assignee: Sony Corporation, Tokyo (JP)

(\*) Notice: Subject to any disclaimer, the term of this patent is extended or adjusted under 35 U.S.C. 154(b) by 1041 days.

(21) Appl. No.: 11/017,728

(22) Filed: Dec. 22, 2004

(65) Prior Publication Data

US 2005/0165540 A1    Jul. 28, 2005

Related U.S. Application Data

(62) Division of application No. 09/661,994, filed on Sep. 14, 2000, now Pat. No. 6,871,004.

(30) Foreign Application Priority Data

Sep. 17, 1999   (JP) ............... P11-264658

(51) Int. Cl.
    *H04N 5/76* (2006.01)
(52) U.S. Cl. ................................. 348/231.5
(58) Field of Classification Search .............. 348/231.5, 348/231.3, 231.99, 222.1, 207.99
    See application file for complete search history.

(56) References Cited

U.S. PATENT DOCUMENTS

| | | | |
|---|---|---|---|
| 5,296,884 A * | 3/1994 | Honda et al. ................. | 396/311 |
| 5,602,749 A | 2/1997 | Vosburgh | |
| 5,726,660 A | 3/1998 | Purdy et al. | |
| 5,841,026 A | 11/1998 | Kirk et al. | |
| 5,869,759 A | 2/1999 | Seigel | |
| 6,282,362 B1 * | 8/2001 | Murphy et al. ................. | 386/46 |
| 6,437,797 B1 | 8/2002 | Ota | |
| 6,507,371 B1 * | 1/2003 | Hashimoto et al. .......... | 348/552 |
| 6,819,356 B1 * | 11/2004 | Yumoto .................... | 348/231.2 |
| 7,301,569 B2 * | 11/2007 | Kinjo et al. .............. | 348/231.5 |

FOREIGN PATENT DOCUMENTS

| | | |
|---|---|---|
| JP | 408023503 A | 1/1996 |
| JP | 09-179491 | 7/1997 |
| JP | 10-233985 | 9/1998 |
| JP | 10-319494 | 12/1998 |

(Continued)

OTHER PUBLICATIONS

F.Yee, IEEE, Position, Location and Navigation Symposium, XP-010117758, pp. 388-393, "GPS and Video Data Collection in Los Angeles County—A Status Report", Apr. 11-15, 1994.

(Continued)

*Primary Examiner*—David L Ometz
*Assistant Examiner*—Akshay Trehan
(74) *Attorney, Agent, or Firm*—Oblon, Spivak, McClelland, Maier & Neustadt, L.L.P.

(57) ABSTRACT

Disclosed is an information processing method comprising the steps of: storing measured position information in association with first time information representing times of day at which the measured position information is obtained; storing video information in association with second time information representing times of day at which the video information is obtained; and associating the measured position information with the video information in accordance with degrees of difference between the first time information and the second time information.

13 Claims, 28 Drawing Sheets

FOREIGN PATENT DOCUMENTS

| WO | WO 95/32483 | 11/1995 |
| --- | --- | --- |
| WO | WO 98/12846 | 3/1998 |

OTHER PUBLICATIONS

"Universal Serial BUS Specification Revision 1.0", Universal Serial Bus Specification, XP 002917782, Jan. 15, 1996, pp. 1-268.

European Office Action, regarding European Patent Application No. 00 120 323.1, dated May 19, 2010, 23 pages.

"GPS III Pilot, Owner's Manual & Reference" Jul. 1997, Garmin Corporation, Romsey, Hampshire, GB, p. 24, 74.

* cited by examiner

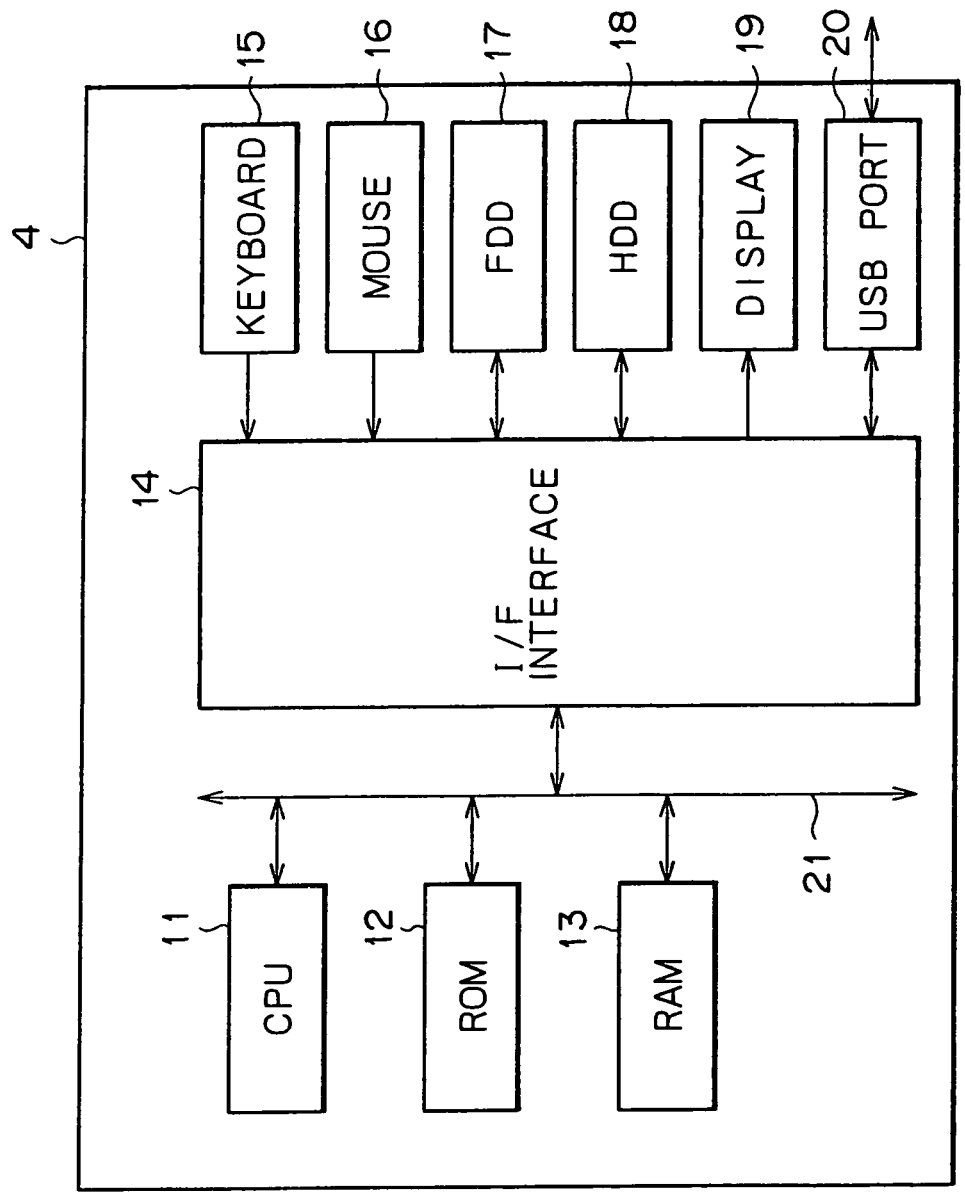

FIG. 10A

| FLAG DATA | LOG DATA BODY |
|---|---|
|  | STATUS |

LOG DATA

FIG. 10B

| START | END | MARK | O/G | DUMMY |
|---|---|---|---|---|

FLAG DATA

FIG. 10C

| TIME OF DAY | LATITUDINAL AND LONGITUDINAL HEMISPHERES | LATITUDE | LONGITUDE | VELOCITY | AZIMUTH |
|---|---|---|---|---|---|

LOG DATA BODY

FILE OF IMAGE CAPTURED
BY DIGITAL CAMERA

FIG. 29

| COUNTER VALUE | FLAGS | | LOG DATA BODY | STATUS | |
|---|---|---|---|---|---|
| 0 | 1 | 0 | 10:18:00 | | ⎫ |
| 1 | 0 | 0 | 10:18:30 | | ⎪ |
| 2 | 0 | 0 | 10:19:00 | | ⎪ |
| ⋮ | | | ⋮ | | LOG DATA |
| 28 | 0 | 0 | 10:32:00 | | ⎪ |
| 29 | 0 | 0 | 10:32:30 | | ⎪ |
| 30 | 0 | 0 | 10:33:00 | | ⎪ |
| 31 | 0 | 1 | 10:33:30 | | ⎭ |

START FLAG — END FLAG

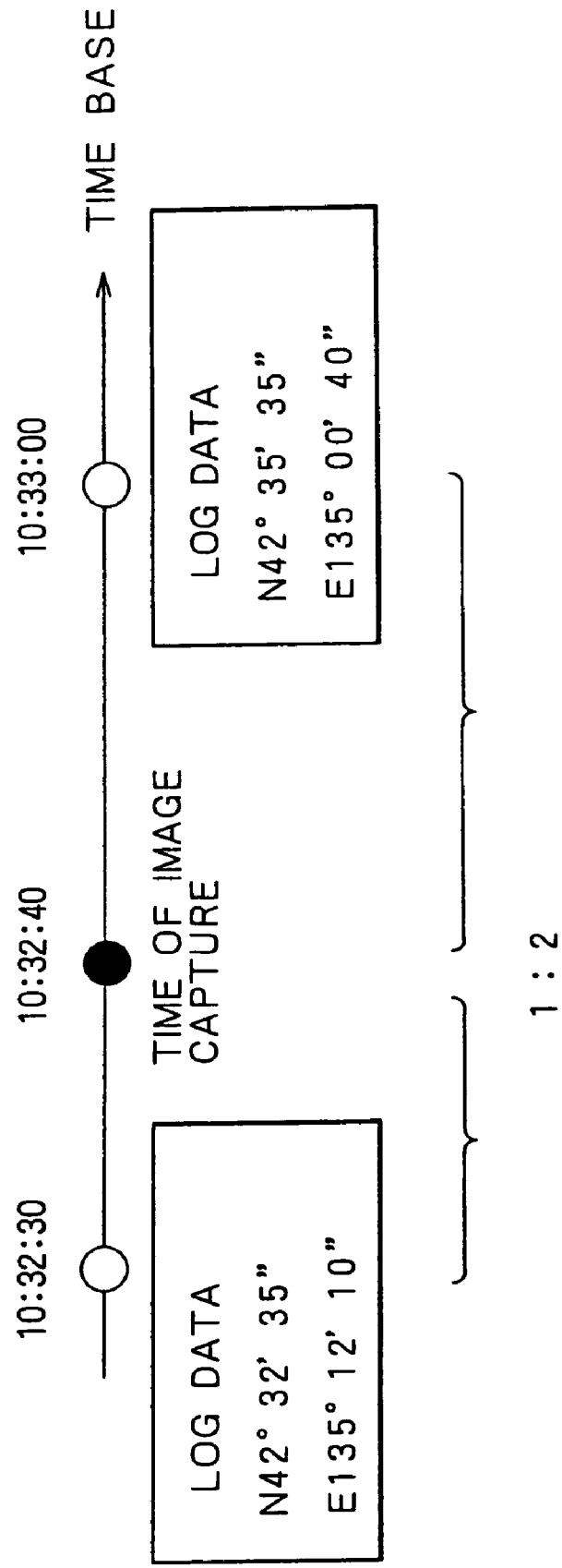

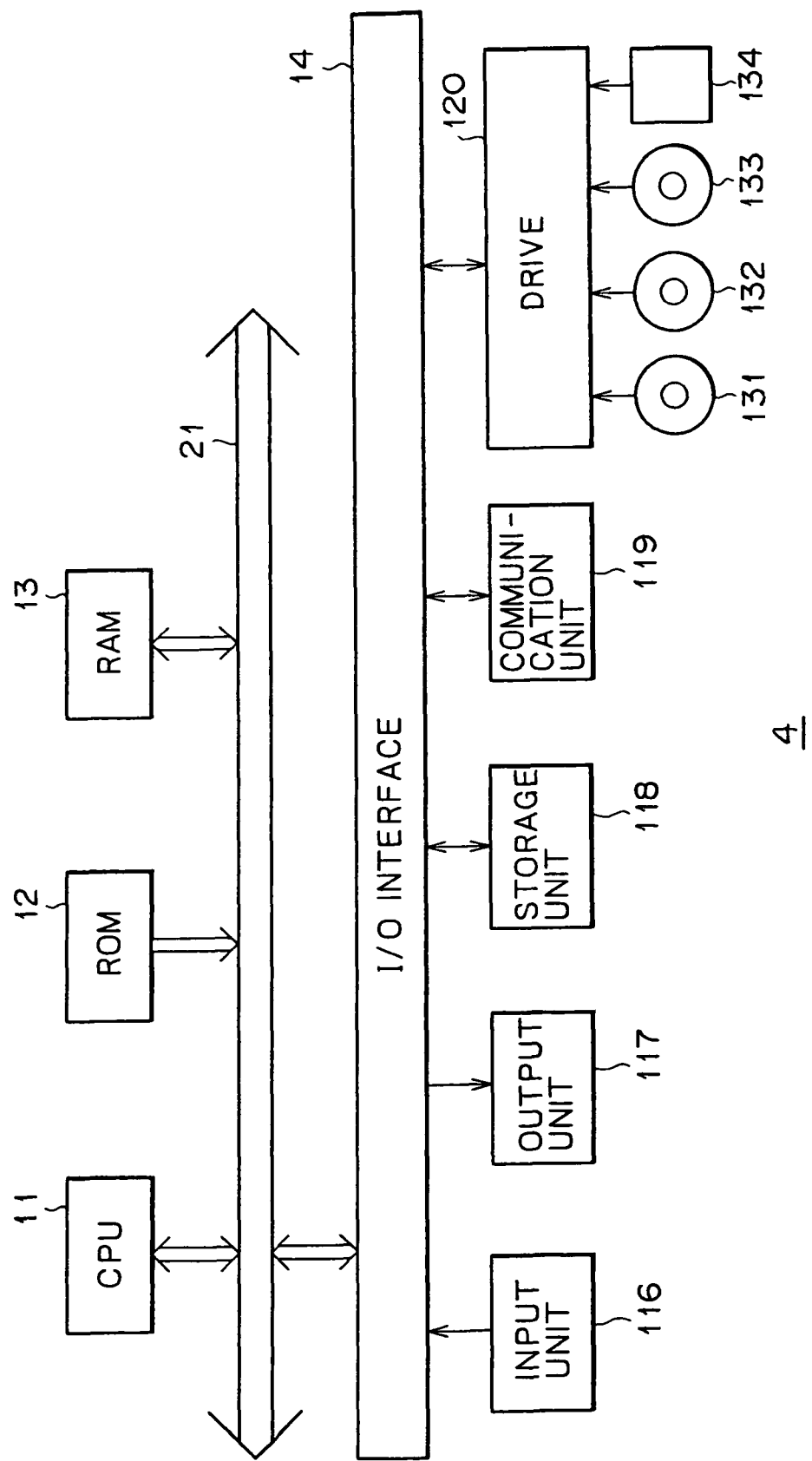

INFORMATION PROCESSING APPARATUS AND METHOD, AND PROGRAM STORAGE MEDIUM

BACKGROUND OF THE INVENTION

The present invention relates to a method and an apparatus for information processing and a program storage medium. More particularly, the invention relates to a method and an apparatus for information processing whereby a GPS device stores position and time information which may later be used by a personal computer or the like to determine during image data editing where and when the images were captured, and a program storage medium for storing such a method.

Recent years have seen the widespread acceptance of apparatuses for capturing, storing and processing images through the use of digital technology. Generally, images such as those taken by digital camera are later arranged by date, grouped into predetermined categories or otherwise sorted out by users. Such follow-up classification of images requires information about where and when the images were captured.

The need for image-classifying information is met illustratively by methods for associating data representing images taken by digital camera or by other means with data about where and when the image data were acquired. One such method, proposed by Japanese Published Unexamined Patent Application Hei 10-2333985, utilizes a digital camera and a GPS (Global Positioning System) device to obtain (i.e., store) positions at which images were captured. According to this method, the GPS device is connected to the digital camera so that position information acquired by the GPS device is stored in association with the image data taken by camera.

Digital cameras connectable to or incorporating a GPS device are capable of associating image data with position data indicating where the images were captured. If a digital camera has no such function, there is no way for the camera to determine image capture positions.

The method disclosed in Japanese Published Unexamined Patent Application Hei 10-2333985 involves connecting a digital camera with a GPS device. That means one disadvantage of the disclosed method is that only the type of digital camera capable of connecting to a GPS device can be used. Another disadvantage is that where a GPS device is incorporated into a digital camera, the combined setup tends to become bulky.

SUMMARY OF THE INVENTION

The present invention has been made in view of the above circumstances and provides an information processing apparatus and method as well as a program storage medium allowing position and time-of-day information to be stored into a GPS device so that the stored information is later used by a personal computer or the like to determine during image data editing where and when the images were captured, whereby users may perform editing work more easily than before.

In carrying out the invention and according to one aspect thereof, there is provided an information processing method comprising the steps of: storing measured position information in association with first time information representing times of day at which the measured position information is obtained; storing video information in association with second time information representing times of day at which the video information is obtained; and associating the measured position information with the video information in accordance with degrees of difference between the first time information and the second time information.

According to another aspect of the invention, there is provided an information processing method comprising the steps of: reading stored log data associating measured position information with first time information representing times of day at which the measured position information is obtained; and plotting on a map the measured position information acquired from the log data.

According to a further aspect of the invention, there is provided an information processing method comprising the steps of: reading stored log data associating measured position information with first time information representing times of day at which the measured position information is obtained; and plotting, in the order of the first time information, the measured position information acquired from the log data.

According to an even further aspect of the invention, there is provided a program storage medium which stores a program for causing an information processing apparatus to execute the steps of: storing measured position information in association with first time information representing times of day at which the measured position information is obtained; storing video information in association with second time information representing times of day at which the video information is obtained; and associating the measured position information with the video information in accordance with degrees of difference between the first time information and the second time information.

According to a still further aspect of the invention, there is provided a program storage medium which stores a program for causing an information processing apparatus to execute the steps of: reading stored log data associating measured position information with first time information representing times of day at which the measured position information is obtained; and plotting on a map the measured position information acquired from the log data.

According to a yet further aspect of the invention, there is provided a program storage medium which stores a program for causing an information processing apparatus to execute the steps of: reading stored log data associating measured position information with first time information representing times of day at which the measured position information is obtained; and plotting, in the order of the first time information, the measured position information acquired from the log data.

According to another aspect of the invention, there is provided an information processing apparatus comprising: a first storing element for storing measured position information in association with first time information representing times of day at which the measured position information is obtained; a second storing element for storing video information in association with second time information representing times of day at which the video information is obtained; and an associating element for associating the measured position information with the video information in accordance with degrees of difference between the first time information and the second time information.

According to a further aspect of the invention, there is provided an information processing apparatus comprising: a reading element for reading stored log data associating measured position information with first time information representing times of day at which the measured position information is obtained; and a plotting element for plotting on a map the measured position information acquired from the log data.

According to an even further aspect of the invention, there is provided an information processing apparatus comprising: a reading element for reading stored log data associating measured position information with first time information representing times of day at which the measured position information is obtained; and a plotting element for plotting, in the order of the first time information, the measured position information acquired from the log data.

Other objects, features and advantages of the invention will become more apparent upon a reading of the following description and appended drawings.

BRIEF DESCRIPTION OF THE DRAWINGS

Preferred embodiments of the present invention will be described in detail with reference to the following figures wherein:

FIG. 2 is a block diagram showing an internal structure of a personal computer included in FIG. 1;

FIGS. 10A, 10B and 10C are explanatory views of log data to be stored into the GPS device;

FIG. 29 is an explanatory view of log data;

FIG. 30 is an explanatory view showing how an image capture position is illustratively estimated; and FIG. 31 is an explanatory view of storage media for use with the invention.

DETAILED DESCRIPTION OF THE PREFERRED EMBODIMENTS

Figure 1:
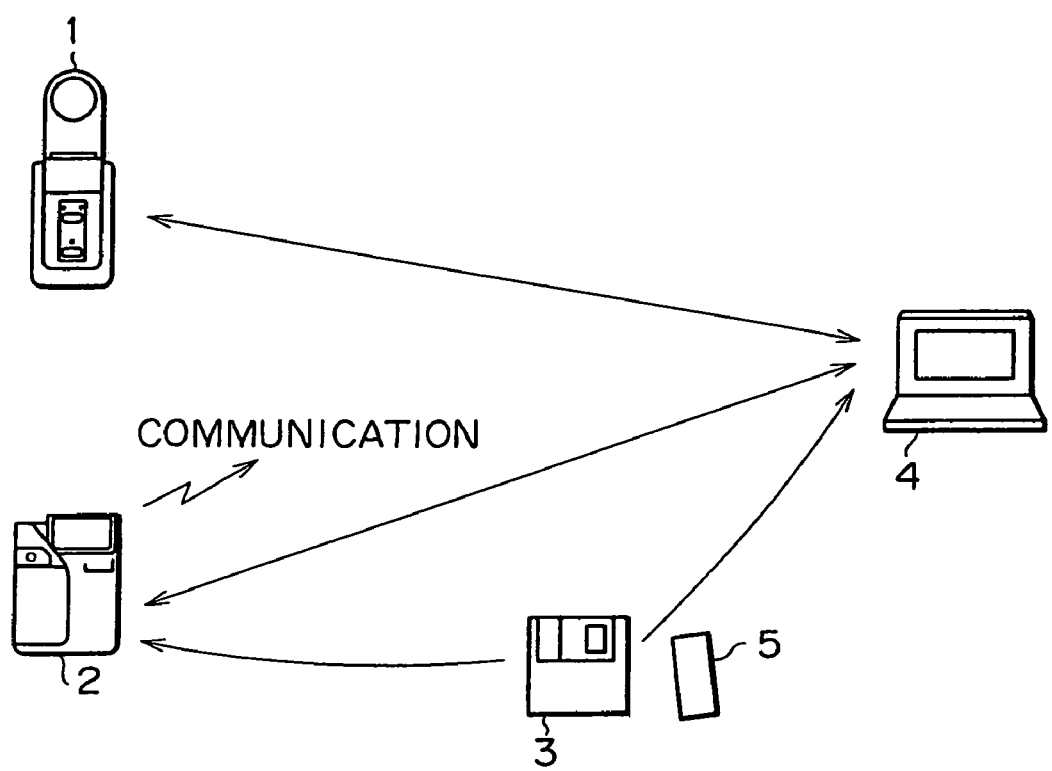
FIG. 1 is a schematic view outlining a typical configuration of an information processing system embodying the invention.

FIG. 1 is a schematic view outlining a typical configuration of an information processing system embodying the invention. A GPS device 1 receives signals from satellites, not shown, analyzes the received signals to compute positions of reception (latitude and longitude), and stores the computed position information. Satellites usually carry an atomic clock each so that the GPS device 1 may acquire time information from the signal received therefrom. The time information thus obtained is also stored. In the description that follows, the information comprising position and time information stored in the GPS device 1 will be referred to as log data. A digital camera 2 captures images of subjects, and stores data constituting the captured images onto a storage medium such as a floppy disk 3 (the images captured by the digital camera 2 are hereunder assumed to be stored on the floppy disk 3).

Besides the floppy disk 3, other storage media such as a portable semiconductor memory 5 may be used to accommodate the images taken by the digital camera 2. If the digital camera is equipped with a communication function, the captured image data may be transmitted through the function to another device for storage therein.

A personal computer 4 is connected to the GPS device 1 through a USB (Universal Serial Bus) cable and is fed with log data from inside the GPS device 1. The personal computer 4 may also be connected to the digital camera 2 through a USB cable. Thus connected, the personal computer 4 may read image data from the digital camera 2. It is also possible for the personal computer 4 to retrieve image data from the floppy disk 3.

FIG. 2 is a block diagram showing an internal structure of the personal computer 4. A CPU 11 of the personal computer 4 carries out various processes in accordance with programs held in a ROM (read only memory) 12. A RAM (random access memory) 13 accommodates data and programs that may be needed by the CPU 11 during process execution. An input/output interface (I/F) 14 is connected with a keyboard 15 and a mouse 16, sending signals from these components to the CPU 11. The I/O interface 14 is also connected with a floppy disk drive (FDD) 17 and a hard disk drive (HDD) 18 so that data and programs are written and read thereto and therefrom. The I/O interface 14 is further connected with a display 19 as well as with the GPS device 1 via a USB port 20. An internal bus 21 interconnects these components.

Figure 3A:
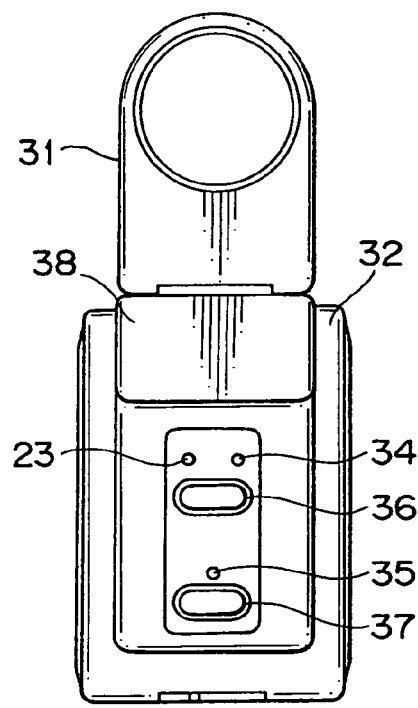
FIGS. 3A through 3D are schematic views sketching an appearance of a GPS device included in FIG. 1.
Figure 3C:
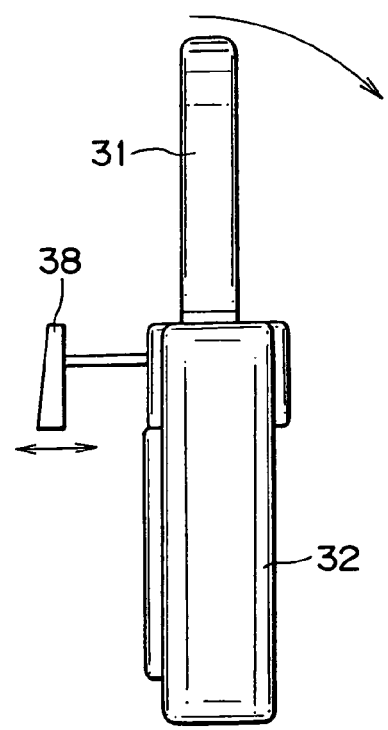
Figure 3B:
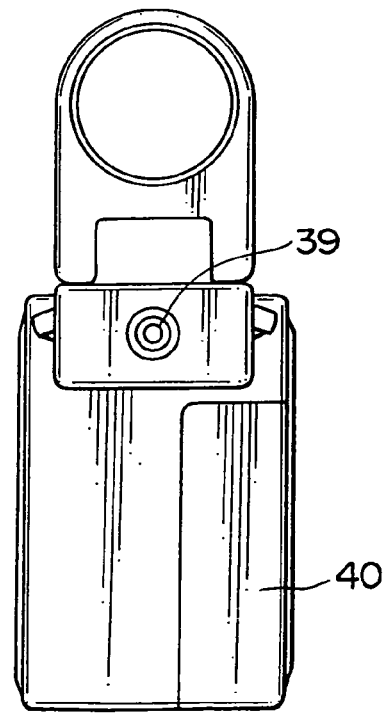
Figure 3D:
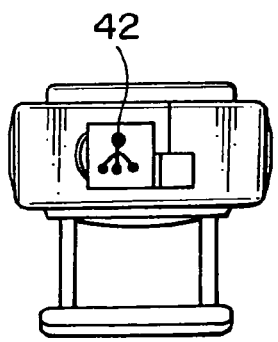

FIGS. 3A through 3D are schematic views sketching an appearance of the GPS device 1. FIG. 3A is a front view, FIG. 3B is a back view, FIG. 3C is a right-hand-side view, and FIG. 3D is a bottom view, of the GPS device 1. The GPS device 1 is made up of an antenna 31 and a body 32. The antenna 31 is attached to the body 32 in a backward swiveling manner. The body 32 is furnished with a GPS lamp 33, a REC lamp 34 and a POWER lamp 35, as well as a mark button 36 and a power button 37. A PC hook 38 is also provided on the body 32.

The PC hook 38, used to attach the GPS device 1 to a notebook type personal computer 4 (mobile computer), moves in an extendable and retractable manner with respect to the body 32. Although FIG. 3C shows the PC hook 38 being extended (extracted) away from the body 32, the PC hook 38 is usually retracted into the body 32 to avoid interference with nearby objects. Loaded with a spring (not shown), the PC hook 38 retracts by itself into the body 32 when released from its manually extended position.

Figure 4:
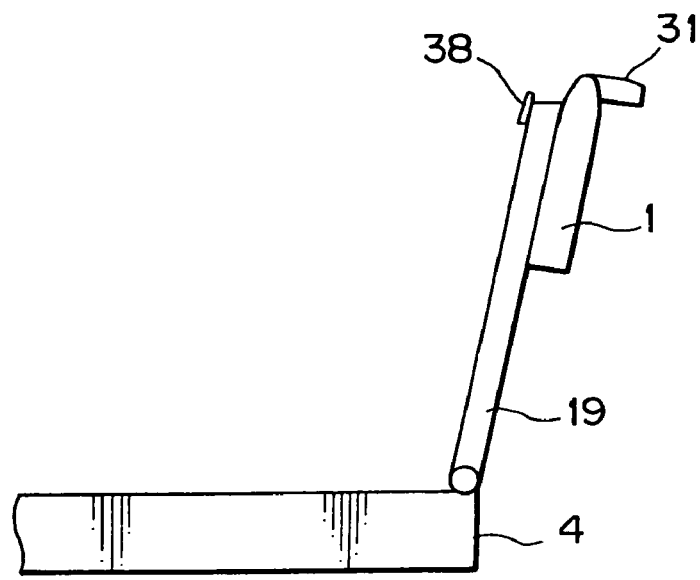
FIG. 4 is an explanatory view of the GPS device as it is attached to the personal computer.

The PC hook 38, extended from the body 32 as shown in FIG. 3C, clips the GPS device 1 onto a notebook type personal computer 4. More specifically, with the personal computer 4 opened as depicted in FIG. 4, an edge of the display 19 is sandwiched between the extended PC hook 38 and the body 32. The components attach the GPS device 1 onto the personal computer 4. Since the PC hook 38 is loaded with the spring as mentioned, the extended hook puts a certain amount of pressure onto the display 19 against the body 32 to prevent the GPS device 1 from falling in case of an impact or vibrations exerted on the computer 4.

When the GPS device 1 is clipped onto the personal computer as shown in FIG. 4, they may constitute a navigation system used illustratively on vehicles. The personal computer 4 is made to execute an application program that runs the navigation system. The application program in operation causes the display 19 illustratively to indicate a map containing the current position of the system. Data for displaying the current position are computed using position information acquired by the GPS device 1. Where the personal computer 4 and GPS device 1 are used as the navigation system, the antenna 31 attached pivotally to the body 32 may be suitably adjusted in angle relative to the body 32 before being fixed (i.e., at an optimal angle for receiving signals from satellites), as illustrated in FIG. 4.

Figure 5:
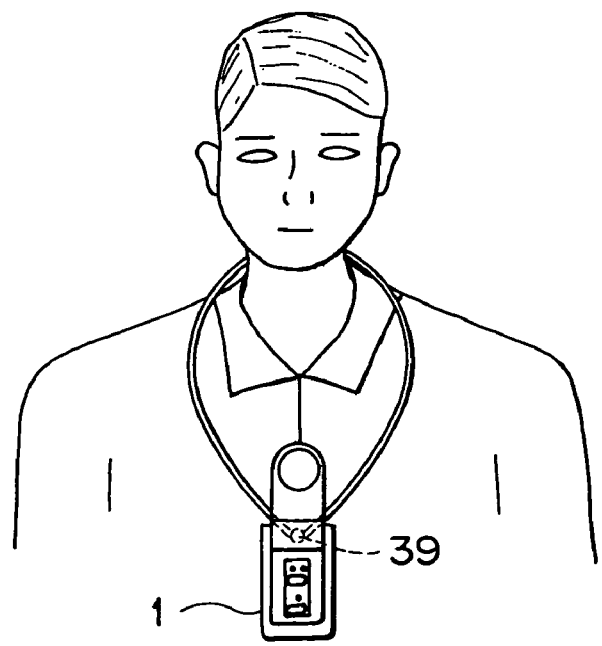
FIG. 5 is an explanatory view showing a user carrying the GPS device around.

The GPS device 1 may be carried around by a user. In such a case, the user may retract the PS hook 38 into the body 32 to avoid interference with nearby objects. A strap may be threaded through a strap buckle 39 (FIG. 3B) on the device body, and the strap may be passed around the user's neck or hooked onto his belt for carrying purposes. Illustratively, as sketched in FIG. 5, the user may thread a long strap through the strap buckle 39 to hang the GPS device 1 from his neck for portable use.

As shown in FIG. 3B, the GPS device 1 has a battery lid 40 on its back. Displacing the battery lid 40 rightward as seen in FIG. 3B opens the lid. Either primary or second batteries may be used. The GPS device 1 may be designed to have a function for letting secondary batteries be recharged while they are being loaded in the device 1. The GPS device 1 also has a USB port 42 allowing the device 1 to exchange data with the personal computer 2.

Figure 6:
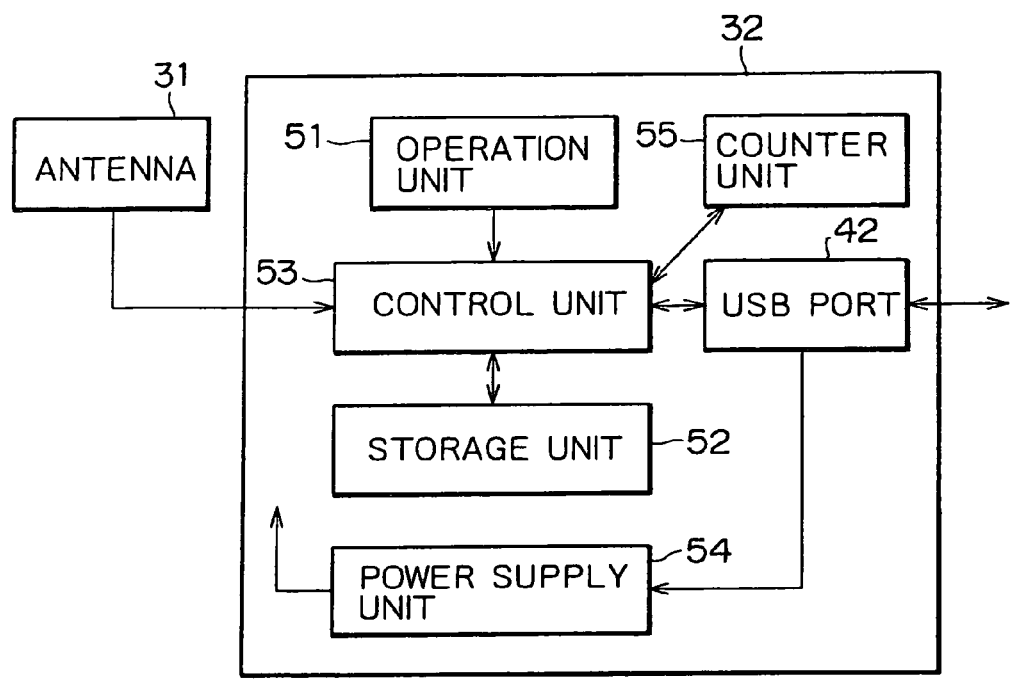
FIG. 6 is a block diagram depicting an internal structure of the GPS device.

FIG. 6 is a block diagram showing an internal structure of the GPS device 1. As mentioned above, the GPS device 1 is composed of the antenna 31 and the body 32. The body 32 includes circuits that carry out diverse processes. FIG. 6 depicts blocks that functionally categorize these circuits. An operation unit 51 includes the mark button 36 and power button 37 manipulated by the user to effect desired operations. A storage unit 52 stores log data.

A control unit 53 generates log data based on signals received through the antenna 31, stores the log data thus generated, and performs processes to address signals coming through the USB port 42 or from the operation unit 51. A power supply unit 54 supplies the necessary components of the GPS device 1 with power derived from batteries or from the personal computer 4 via the USB port 42. A counter unit 55 performs time management, manages various counter values (to be described later), and feeds the management information to the control unit 53.

The GPS device 1 has three defined modes: GPS mode, PC mode, and storage mode. The GPS mode is selected when the GPS device 1 is connected to the personal computer 4 for use as a GPS signal receiving antenna of a navigation system. The PC mode is selected when the GPS device 1 outputs log data from the storage unit 52 or establishes various settings as instructed by the personal computer 4 connected to the GPS device 1. The storage mode is selected illustratively for the GPS device 1 to be carried around by the user with log data held in the storage unit 52.

The storage mode is further classified into three states: wake state, sleep sate, and wake-up sate. The wake state is a state in which data are being stored. In the sleep state, data storing operations are being halted. The wake-up state is a state in which the GPS device 1 is roused temporarily from its sleep state to perform a data storing operation before going back to the sleep state.

Figure 7:
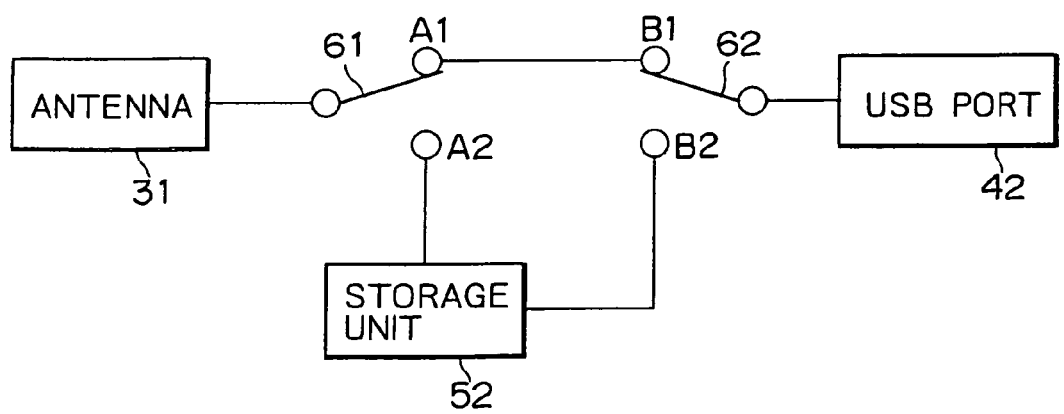
FIG. 7 is an explanatory view of switches in the GPS device.

The GPS device 1 has switches built inside. These switches are operated by the control unit 53 depending on which of the three modes above is currently selected. More specifically, the GPS device 1 has switches 61 and 62 furnished as shown in FIG. 7. In the GPS mode, the control unit 53 connects the switch 61 to a terminal A1 and the switch 62 to a terminal B1.

In the PC mode, the switch 61 is connected either to the terminal A1 or to a terminal A2 while the switch 62 is connected to a terminal B2. In the PC mode, the GPS device 1 operates in keeping with commands from the personal computer 4. If a command tells the GPS device 1 to act as a GPS instrument (i.e., to output signals received by the antenna 31), then the switch 61 is connected to the terminal A1; if a command instructs the GPS device 1 to output log data from the storage unit 52, then the switch 62 is connected to the terminal A2. The switch 61 is forcibly connected (as part of initialization) to the terminal A1 if the GPS device 1 is judged to be currently capable of communicating (data) with the personal computer 4; otherwise the switch 61 is connected to the terminal A2.

In the storage mode, the control unit 53 connects the switch 61 to the terminal A2. Since the GPS device 1 is disconnected from the personal computer 4 when the storage mode is in effect, the switch 62 may be connected either to the terminal B1 or to the terminal B2 with no operative difference resulting from the two settings. Thus the switch 62 is connected to the terminal B1 by default in the storage mode.

Figure 8:
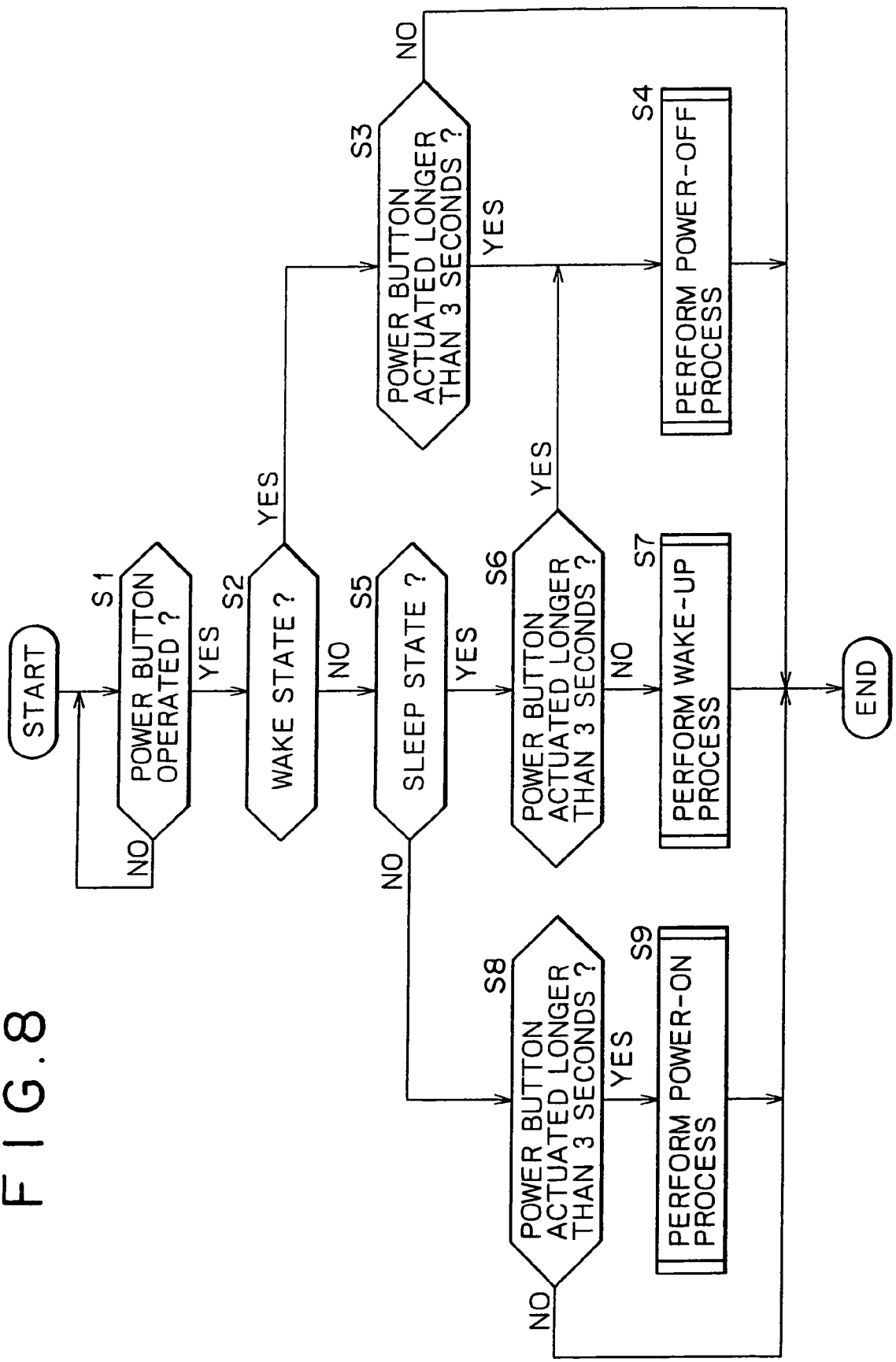
FIG. 8 is a flowchart of steps in which the GPS device operates.

How the GPS device 1 works will now be described by referring to the flowchart of FIG. 8. The steps making up the flowchart of FIG. 8 are performed when the GPS device 1 is not connected with the personal computer 4, i.e., when the storage mode is in effect. Neither the GPS mode nor the PC mode applies to the workings here.

In step S1 of FIG. 8, the control unit 53 checks to see if the power button 37 is operated. The process of step S1 is repeated until the power button 37 is judged to be operated (i.e., the GPS device 1 maintains its status until the power button 37 is operated). If the power button 37 is judged to be operated, step S2 is reached. In step S2, a check is made to see if the wake state is selected.

If in step S2 the wake state is judged to be in effect, i.e., if the GPS device 1 is already turned on and its power button 37 is operated with log data being stored, then step S3 is reached. In step S3, a check is made to see if the power button 37 is being actuated longer than three seconds. The period of three seconds is cited here merely as a typical reference value; other duration in seconds may be adopted instead. The reference value is established to serve as a criterion by which to pick one of several possibilities: the power button 37 may have been operated to turn on or off the GPS device 1; the power button 37 may have been actuated to execute a process of step S7 (to be described later); or the power button 37 may have been activated inadvertently while the device is being carried around strapped illustratively to the user's belt (operational error).

If in step S3 the power button 37 is not judged to be actuated longer than three seconds, an operational error is recognized and no action takes place. If the power button 37 is judged to be actuated longer than three seconds in step S3, then step S4 is reached in which a power-off process is carried out.

Figure 9:
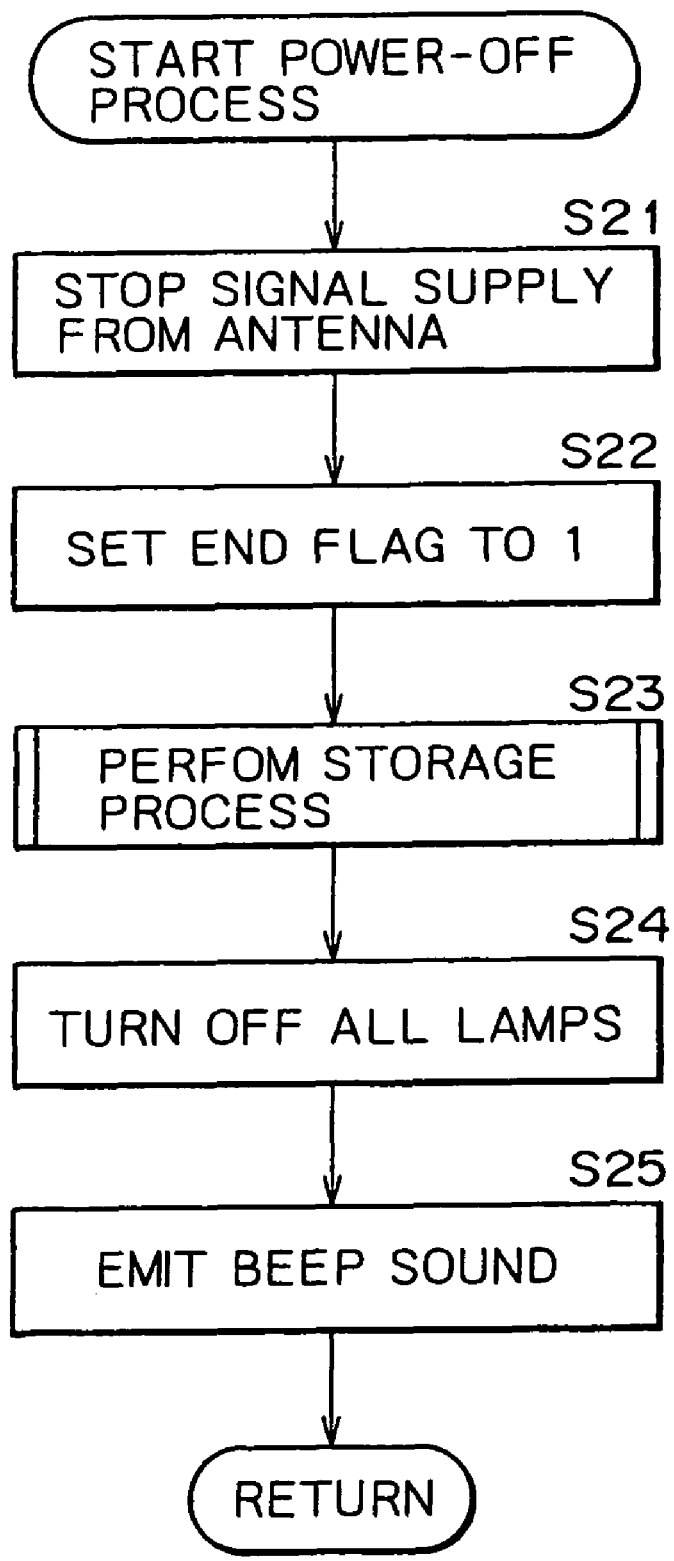
FIG. 9 is a flowchart of steps detailing the process in step S4 of FIG. 8.

FIG. 9 is a flowchart of steps detailing the power-off process in step S4. When the power-off process is initiated, the supply of signals from the antenna 31 is stopped in step S21. In step S22, an end flag is set to 1. A structure of log data to be stored is explained hereunder. One piece of log data is formed as a 19-byte fixed-length data item, as shown in FIG. 10A. The byte size, to be discussed below, is merely an example and may be replaced by any other suitable byte size.

Of the 19 bytes making up each log data item, one byte is assigned to flag data, 17 bytes are allocated to a log data body, and the remaining one byte is apportioned to status data. The flag data have a data structure shown in FIG. 10B. In the single byte flag data, a start flag, an end flag, a mark flag and an O/G flag are each assigned one bit; the remaining four bits are set aside as dummies.

The start flag is set to 1 when indicating the first log data item recorded with the storage mode brought into effect; otherwise (i.e., when the data item in question is the second or subsequent data item recorded with the storage mode in effect), the start flag is set to 0. In like manner, the end flag is set to 1 when indicating the last log data recorded in the storage mode; otherwise the end flag is set to 0.

The mark flag is set to 1 when indicating a logo data item recorded by operation of the mark button 36 (to be described later in detail); otherwise the mark flag is set to 0.

If the O/G flag is set to 1 while the start flag is at 0, that means the log data item in question is not data stored in the current storage mode but the most recently stored data from the previous storage mode. If the O/G flag is set to 0 while the start flag is at 0, that means the stored log data item is data recorded in the current storage mode. If the O/G flag is set to 1 while the start flag is at 1 (i.e., if the flags indicate the first log data item recorded in the current storage mode), that means the log data are those recorded from beginning to end in the Tokyo geodetic system. If the O/G flag is set to 0 while the start flag is at 1, that means the log data are those stored from beginning to end in the World Geodetic System (WGS84).

The log data body is structured as shown in FIG. 10C. Of the 17 bytes constituting the data body, 6 bytes stand for a time of day, 0.5 bytes for latitudinal and longitudinal hemispheres, 3.5 bytes for a latitude, 4 byte for a longitude, 1.5 bytes for a velocity, and 1.5 bytes for an azimuth.

The time of day is defined in terms of year, month, day, hours, minutes, and seconds based on UTC (Universal Time Coordinated). The latitudinal and longitudinal hemispheres are defined by the following data: if the most significant bit is 0, that means subsequent latitudes are in the north; if the MSB is 1, that means subsequent latitudes are in the south; if the bit next to the MSB is 0, that means subsequent longitudes are in the east; if the bit next to the MSB is 1, that means subsequent longitudes are in the west.

The latitude is given as seven-digit numeric data and the longitude is indicated as eight-digit numeric data. The velocity is given as three-digit numeric data in increments of one Km/h. The azimuth designates the direction in which the user is advancing and is defined by three-digit numeric data in increments of one degree in a clockwise 360-degree range with the true north set for 0.

Figure 11:
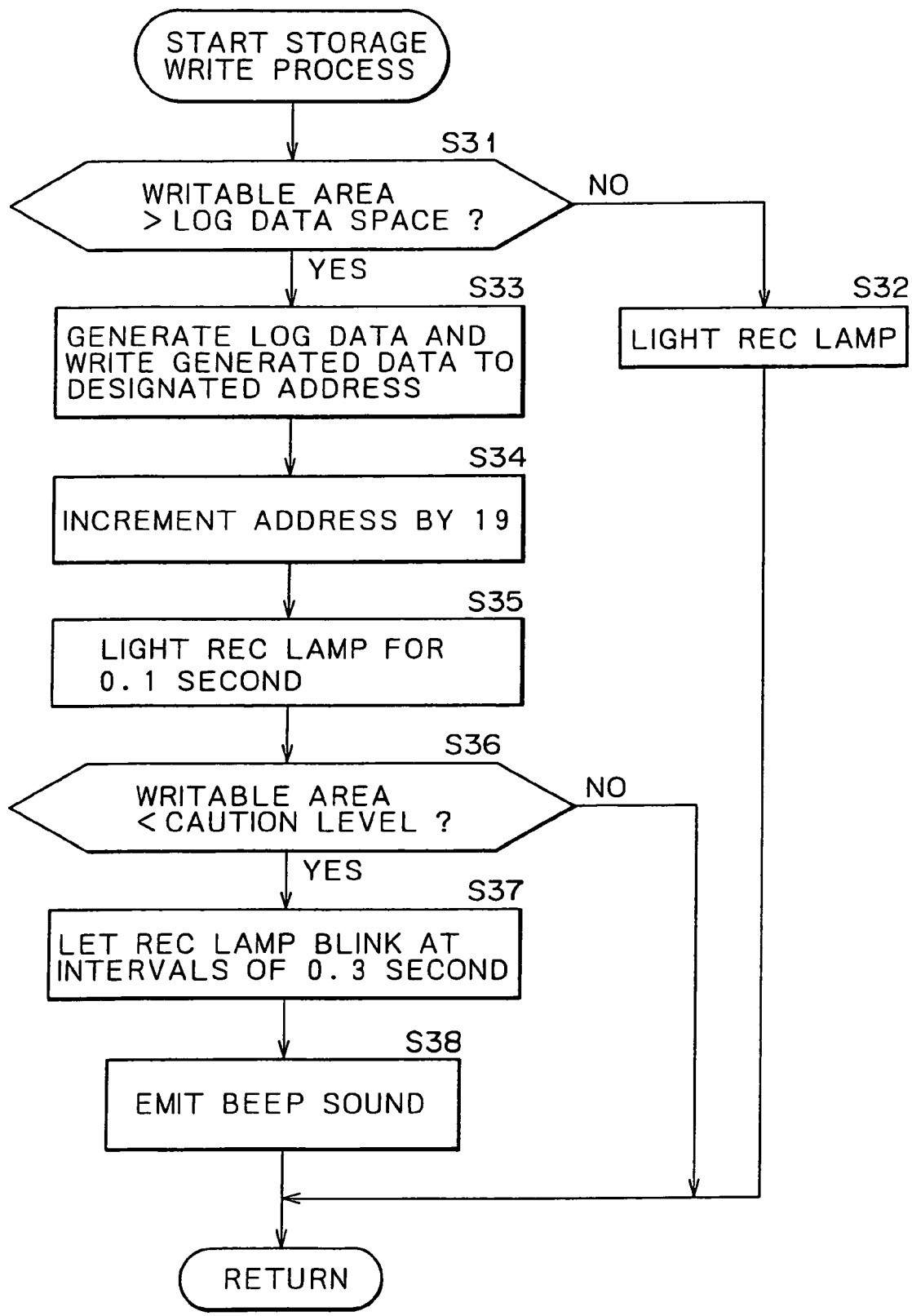
FIG. 11 is a flowchart of steps detailing the process in step S23 of FIG. 9.

Returning to the flowchart of FIG. 9, the end flag in the log data is set to 1 in step S22. In step S22, a storage process is performed. FIG. 11 is a flowchart of steps detailing the storage process. This process is carried out to have the above-described log data generated and placed into the storage unit 52 (FIG. 6).

In step S32 of FIG. 11, the control unit 53 checks a writable area in the storage unit 52. Specifically, a check is made to see if the writable area has enough space to accommodate one log data item, i.e., a 19-byte space in this example. If the writable area is judged to be less than 19 bytes long, step S32 is reached in which the REC lamp 34 is illuminated. The REC lamp 34 is illustratively red in color and remains lit red as long as log data cannot be stored due to a lack of the writable area.

If in step S31 the writable area of the storage unit 52 is judged to have sufficient space to accommodate the log data, step S33 is reached. In step S33, the above-described log data are generated and written to a designated address in the storage unit 52. In step S34, an address is set at which to store the next log data. Specifically, the address value is incremented by 19.

With the log data thus stored, step S35 is reached in which the REC lamp 34 is lit for 0.1 second to notify the user of the data storage. In step S36, a check is made to see if the writable area has fallen short of a caution level. If the available area in the storage unit 52 is judged to have dropped below the caution level, a process is carried out to notify the user thereof. The default caution level is set for 10 percent of the capacity of the storage unit 52 (i.e., space to store log data). The caution level may be modified by the user in a manner to be described later.

The storage unit 52 may illustratively have a capacity large enough to store log data every second for up to 7.5 hours. In that case, the capacity of the storage unit 52 amounts to 513,000 bytes (=19 bytes×60 seconds×60 minutes×7.5 hours). If the caution level is set for 10 percent of the capacity, the level is then established at 51,300 bytes.

If in step S36 the writable area is judged to be less than the caution level, step S37 is reached. In step S37, the REC lamp 34 keeps blinking at intervals of 0.3 seconds, informing the user that the available area in the storage unit 52 is being exhausted. In step S38, a beep sound is emitted as a warning. Although the beep may sound in any tone, in any volume and in whatever melody, the sound emission should preferably be characterized by different melodies and tones depending on the current status of the GPS device 1 so that the user immediately recognizes what is happening upon hearing the sound. Illustratively, a continuous beep emission "bleep, bleep, bleep, . . . " may be used to warn that the capacity of the storage unit 52 is getting exhausted.

Suppose that the user is given such a warning of a shortage in the writable area of the storage unit 52 and still fails to take action such as one to end the storage operation or to erase unnecessary log data, thus continuously storing log data and eventually letting the writable capacity of the storage unit 52 be totally exhausted. In that case, the GPS device 1 is switched off, and the stored log data are held intact unless otherwise specified by the user. There is no possibility of any stored log data forcibly or inadvertently erased or made unavailable to the user at a later date.

If in step S36 the writable area is judged to be higher than the caution level, the processes of steps S37 and S38 are skipped, and the storage process is brought to and end.

With the storage process terminated, step S24 (FIG. 9) is reached in which all lamps are turned off. More specifically, the GPS lamp 33, REC lamp 34 and POWER lamp 35 are switched out of their lighted or blinking state. In step S25, a beep sound is emitted to notify the user that the power-off process has ended. The beep may illustratively have a melody of "(two consecutive) bleep, bleep."

Returning to the flowchart of FIG. 8, suppose that the check in step S2 has revealed that the wake state is not in effect. In that case, step S5 is reached in which a check is made to see if the sleep state is selected. If in step S5 the sleep state is judged to be selected, step S6 is reached. In step S6, as in step S3, a check is made to see if the power button 37 is being actuated longer than three seconds. If in step S6 the power button 37 is judged to be actuated longer than three seconds, step S4 is reached. Step S4 has already been discussed and will not be described here further.

Figure 12:
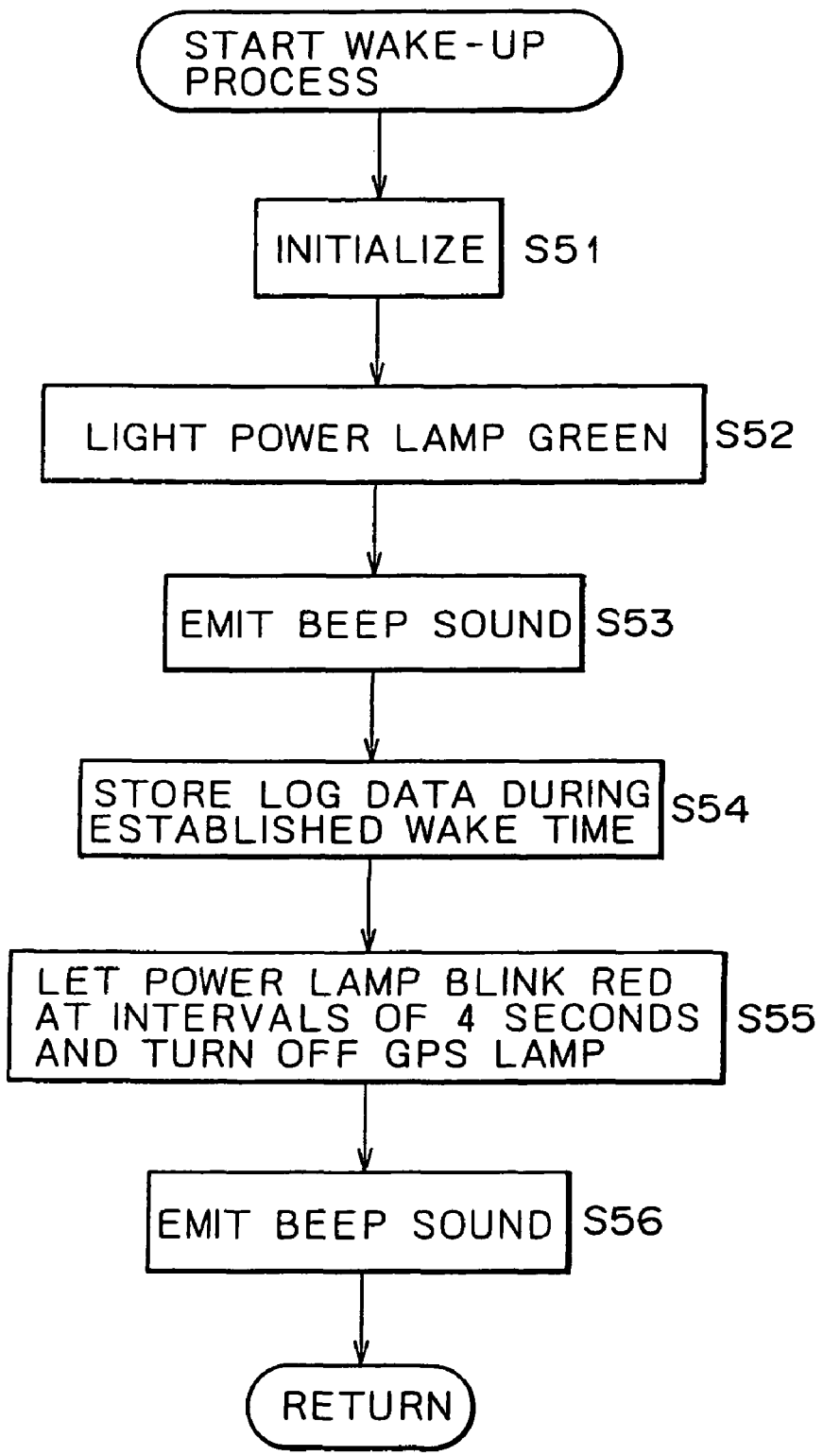
FIG. 12 is a flowchart of steps detailing the process in step S7 of FIG. 8.

If in step S6 the power button 37 is not judged to be actuated longer than three seconds, step S7 is reached in which a wake-up process is carried out. FIG. 12 is a flowchart of steps detailing the wake-up process.

In step S51 of FIG. 12, the control unit 52 performs initialization preparatory to starting log data storage. The initialization illustratively involves getting ready for receiving signals through the antenna 31 after leaving the sleep state in which the supply of signals received via the antenna 31 was halted (i.e., supply of power to the antenna 31 was stopped).

In step S52, the POWER lamp 35 is lit green to notify the user that the wake-up state is selected. The POWER lamp 35 is illuminated (or blinks) either green or red depending on the status of the device. Likewise the GPS lamp 33 is lit (or blinks) either green or red depending on the status of the device. Other colors may be adopted for the illumination. In this example, the colors of green and red are assumed to be used for purpose of illustration.

In step S53, a beep sound is emitted to notify the user that the wake-up state is now in effect. The beep may illustratively have a melody of "(a single) bleep".

When ready to store log data, the GPS device 1 enters the wake state for along as a predetermined wake time in which log data may be stored. The wake time is a period of time in which the sleep state is canceled (to continue the wake-up state). The user may set the sleep state for a desired period of time in a process to be described later. A default wake time period of, say, 10 minutes (600 seconds) may also be used if desired.

The storing of log data or other predetermined process is carried out until the wake time thus established elapses. Once the wake time has passed, the sleep state is resumed. The sleep state is restored either following the wake time or upon operation of the power button 37 by the user.

In step S55, the POWER lamp 35 blinks red at intervals of four seconds and the GPS lamp 33 is turned off, notifying the user that the sleep state is resumed (the POWER lamp keeps blinking at intervals of 4 seconds as long as the sleep state is in effect). In step S56, a single bleep sound is emitted.

In this manner, the sleep state may be interrupted for as long as needed by the user to perform the log data storage process.

Returning to the flowchart of FIG. 8, suppose that in step S5 the sleep state is not judged to be in effect. In that case, step S8 is reached in which a check is made to see if the power button 37 is being actuated longer than three seconds. If in step S8 the power button 37 is not judged to be actuated longer than three seconds, the operation is regarded as an operational error and nothing in particular is carried out in response.

If in step S8 the power button 37 is judged to be actuated longer than three seconds, step S9 is reached. Since the wake state is negated in step S2 and the sleep state is denied in step S5, the GPS device 1 is deemed to be in a switched-off state. In that state, the user's obviously intentional operation of the power button 37 is interpreted as his or her desire to turn the device on. Thus a power-on process is carried out in step S9.

Figure 13:
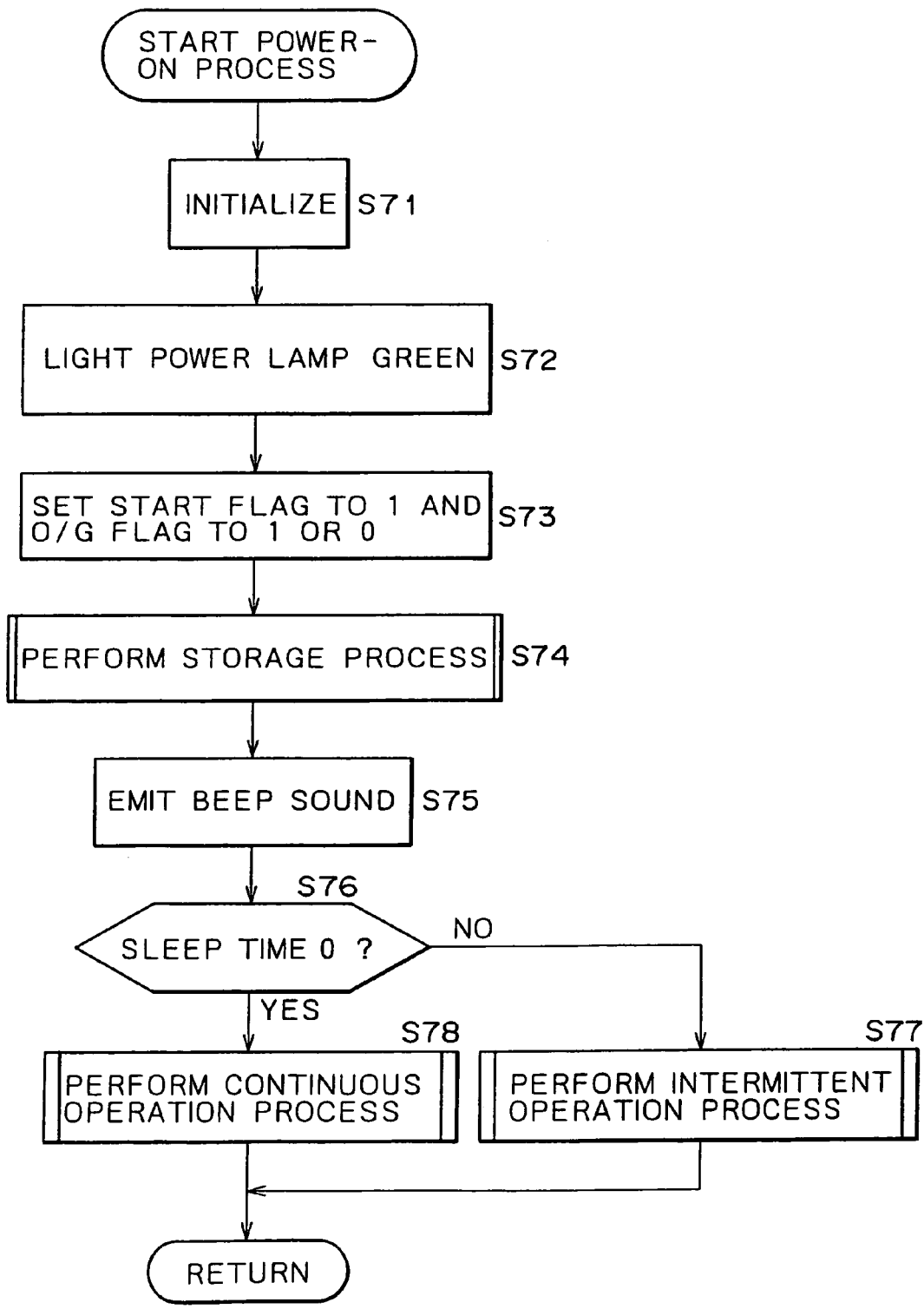
FIG. 13 is a flowchart of steps detailing the process in step S9 of FIG. 8.

FIG. 13 is a flowchart of steps detailing the power-on process. In step S71 of FIG. 13, the control unit 53, given a signal from the operation unit 51, judges that the power button 37 has been operated and performs initialization accordingly for power-up. In step S72, the POWER button 37 is lit green.

In step S73, the start flag is set to 1 and the O/G flag is set to 1 or 0. As discussed above, the O/G flag is set to 1 if the Tokyo geodetic system is in effect with the start flag at 1; the O/G flag is set to 0 if the WGS84 is in effect with the start flag at 1. When the flags are thus set, step S74 is reached in which a storage process is performed. The storage process was already discussed in reference to the flowchart of FIG. 11 and thus will not be described further.

In step S75, a single bleep sound is emitted to notify the user that the GPS device 1 is now switched on. In step S76, a check is made to see if the sleep time is set to zero. The sleep time is a designated period of time in which the sleep state is allowed to continue after the most recent storage of log data. In other words, the sleep time is a parameter that specifies when to store log data.

If the sleep time is set to zero, that means the wake state is allow to continue in the absence of the sleep state. If the sleep time is set to a value other than zero, then the sleep state is to continue for as long as the period of time defined by the value, to be replaced later by the wake state. In other words, the sleep state and the wake state are alternated so that log data are stored intermittently (i.e., only in each wake state). The wake state may continue for up to a period defined as a maximum wake time.

The sleep time and the wake time may be defined by the user as desired. By default, the sleep time is set illustratively to two minutes (120 seconds) and the wake time to 10 minutes (600 seconds).

Figure 14:
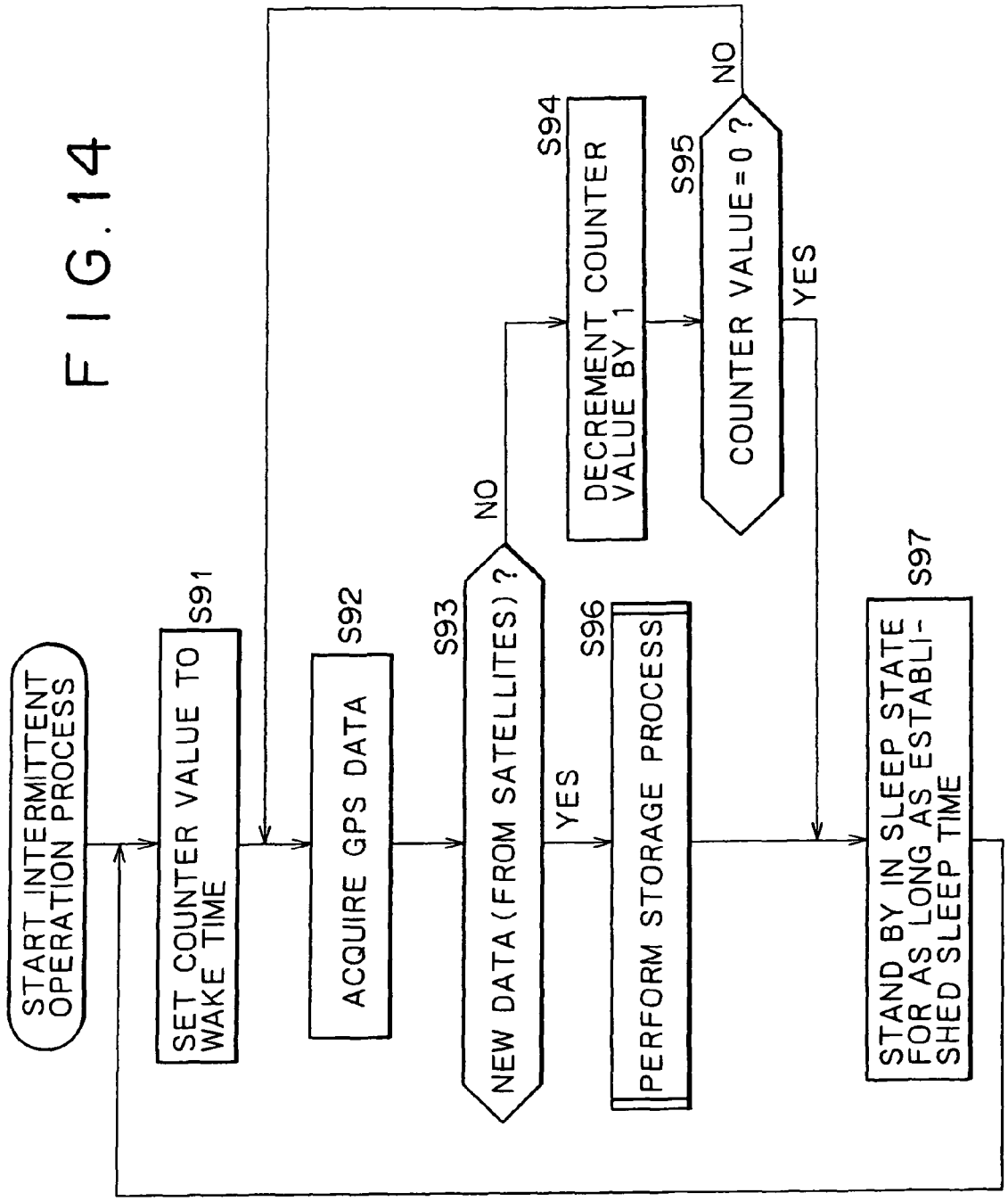
FIG. 14 is a flowchart of steps detailing the process in step S77 of FIG. 13.

If in step S76 the sleep time is judged to be other than zero, step S77 is reached in which an intermittent operation process is performed. FIG. 14 is a flowchart of steps detailing the intermittent operation process. In step S91 of FIG. 14, the counter unit 55 (FIG. 6) on which to count the wake time is set to the currently established wake time.

In step S92, GPS data are acquired, generally at intervals of one second. If the GPS data are derived from signals currently received from satellites, the data are used as new data. If no signal can be received from satellites for the movement, the most recently acquired data from satellites are utilized as old data. In step S93, a check is thus made to see if the GPS data obtained in step S92 are new data (based on signals from satellites).

If in step S93 the GPS data are not judged to be new data, step S94 is reached. In step S94, the value on the counter unit 55 is decremented by one (i.e., by 1 second). In step S95, a check is made to see if the counter value has reached zero. In other words, it is determined whether the wake time has expired. If in step S95 the counter value is not judged to be zero, step S92 is reached again and subsequent steps are repeated. If in step S95 the counter value is judged to be zero, step S97 is reached.

If in step S93 the GPS data are judged to be new data, step S96 is reached for a storage process. The storage process has already been discussed and thus will not be described here further. With the storage process completed, step S97 is reached in which the control unit stands by in a sleep state that may last for as long as a predetermined sleep time. Specifically, in intermittent operation, the storage process is carried out the moment GPS data are obtained from signals coming from satellites after the wake state has been brought into effect. Once the storage process is performed, the sleep state is resumed immediately. Power dissipation is minimized because the sleep state is restored immediately after new GPS data are acquired.

If the predetermined sleep time for the sleep state is two minutes, if the predetermined wake time for the wake state is one minute, and if the GPS device is indoors or otherwise located not to be able to receive signals from satellites, then log data are stored every three minutes. If the GPS device is outdoors or otherwise located to be able to receive signals from satellites easily and if log data are stored one second after the wake state is selected, then the log data are stored approximately every two minutes thereafter.

If no signal is received from satellites in the wake state (i.e., if no new data are obtained), then the process of step S96 is never carried out. In that case, no log data are stored.

If in step S97 the predetermined sleep time has expired in the sleep state, step S91 is reached again. The wake state is then selected again and subsequent steps are repeated.

The steps above constituting the flowchart of FIG. 14 are carried out as an interruption when the power button 37 is operated, when the writable area in the storage unit 52 has been exhausted, or when the supply of power from the power supply unit 54 (with batteries) is stopped. Suitable processes are performed depending on what has actually taken place.

Figure 15:
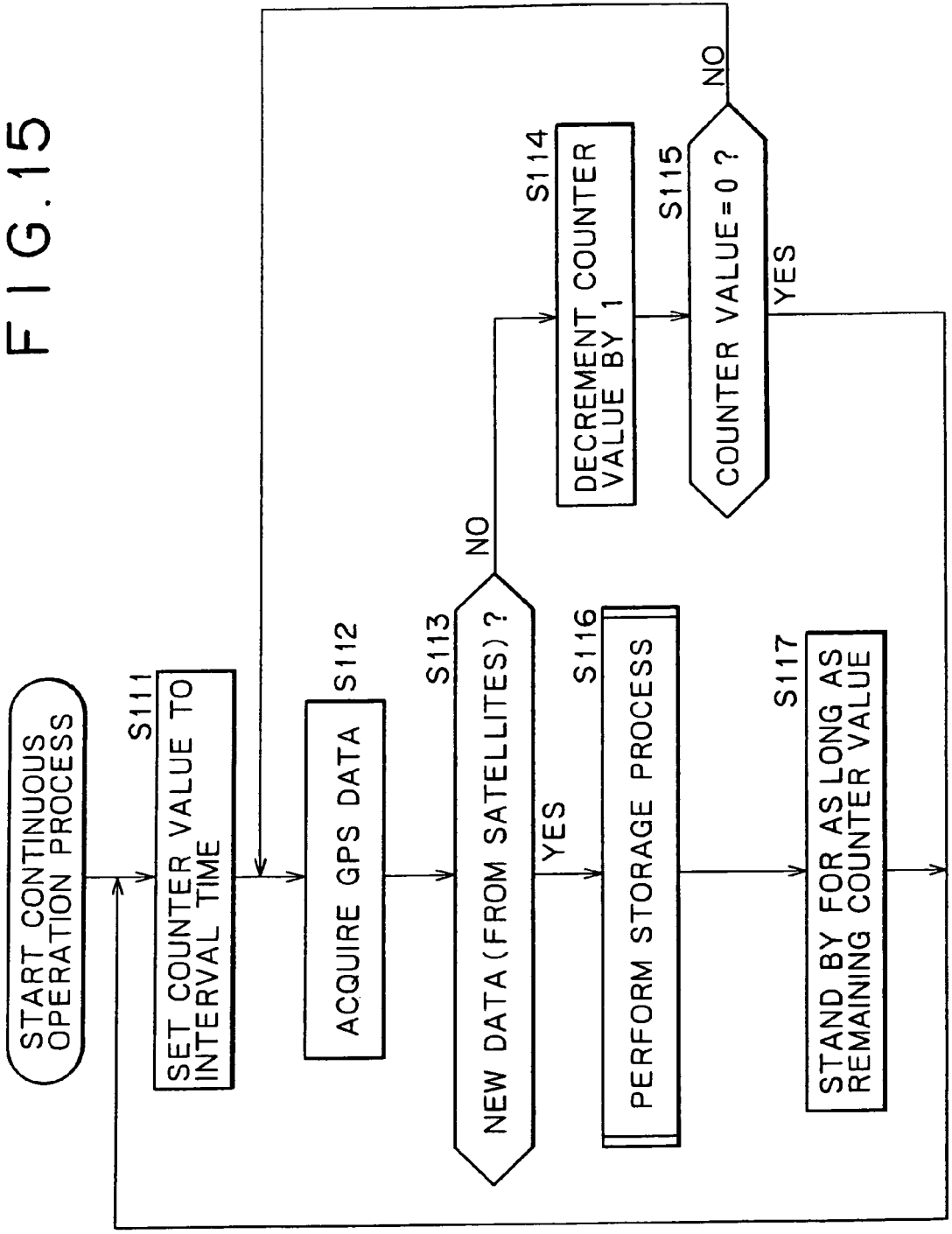
FIG. 15 is a flowchart of steps detailing the process in step S78 of FIG. 13.

Returning to the flowchart of FIG. 13, suppose that in step S76 the sleep time is judged to be zero. In that case, step S78 is reached in which a continuous operation process is carried out. FIG. 15 is a flowchart of steps detailing the continuous operation process. In step S111 of FIG. 15, the counter on which to count an interval time is set to a predetermined interval time. The interval time is used to designate the recording density of log data and may be set to a period between one second and one hour. The default interval time is illustratively five seconds, which means log data are stored at intervals of five seconds.

The processes in steps S112 through S116 are the same as those in steps S92 through S96 of FIG. 14 and thus will not be described further. After the storage process of step S116 is completed, step S117 is reached in which the control unit stands by for a period defined by the remaining counter value (a state in which log data storage or other process is not performed). Illustratively, if the interval time is set for five seconds, the control unit stands by for five seconds, then stores log data, then stands by for another five seconds, and so on. When the standby state in step S117 ends, step S111 is reached again, and subsequent steps are repeated.

Log data are recorded only when signals can be received from satellites. If no signals are received from satellites, no log data are recorded and the standby state is selected. If the interval time is set for longer than one minute, the standby state is replaced by the sleep mode. This makes it possible to minimize power dissipation in the continuous operation process as in the case of the intermittent operation process.

As with the intermittent operation process, the above steps constituting the flowchart of FIG. 15 are carried out as an interruption when the power button 37 is operated, when the writable area in the storage unit 52 has been exhausted, or when the supply of power is stopped.

Below is a description of what takes place when the mark button 36 is operated. In the storage mode with the wake state or wake-up sate in effect, operating the mark button 36 carries out a specific process. In the wake or wake-up state, GPS data may or may not be acquired (i.e., signals from satellites may or may not be received by the antenna 31).

If the mark button 36 is operated while GPS data are being acquired, position and time information in effect at the time of the button operation is stored as log data. In that case, any interval time set for the storage mode is disregarded. That is, log data are stored the moment the mark button 36 is operated; there is no specific timing for log data to be stored. The same holds when the current GPS data cannot be acquired. With no GPS data received from satellites, however, it is impossible to store (or generate) log data including position information based on the new GPS data. In such a case, log data are generated in a manner including the most recent position information (old data) based on signals from satellites.

Time information is supplied by the counter unit 55. In managing its own time, the counter unit 55 corrects the time on the basis of signals received from satellites. If the mark button 36 is operated with no signals acquired from satellites, the counter unit 55 supplies the self-managed time information to the control unit 53. In turn, the control unit 53 generates log data that include the supplied time information, and stores the generated log data into the storage unit 52.

As described, data to be stored by operation of the mark button 36 are accompanied by a mark flag (set to 1) when actually recorded. If the log data contain old data, they are stored with the O/G flag set to 1.

Figure 16:
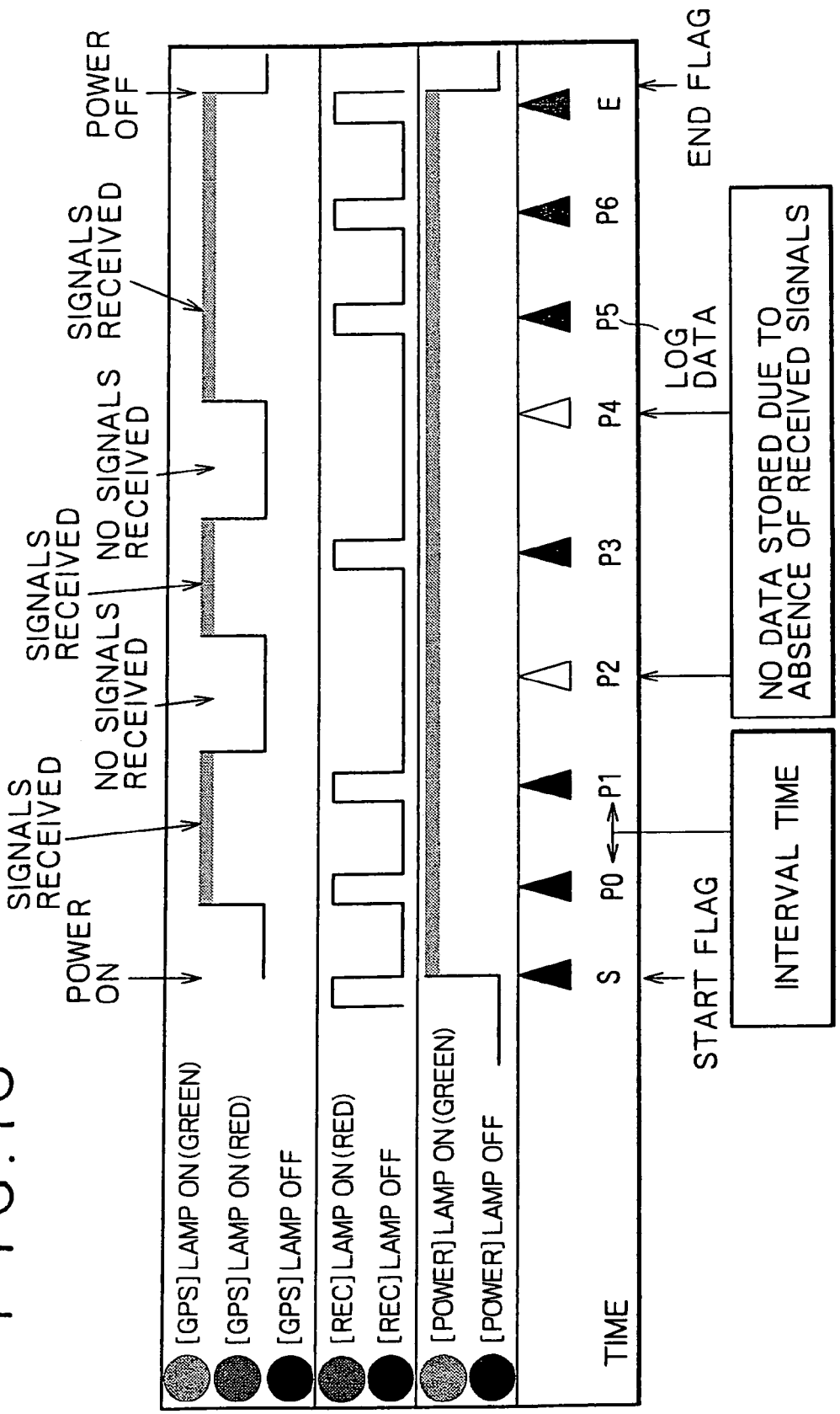
FIG. 16 is a timing chart in effect when the GPS device is activated continuously.
Figure 17:
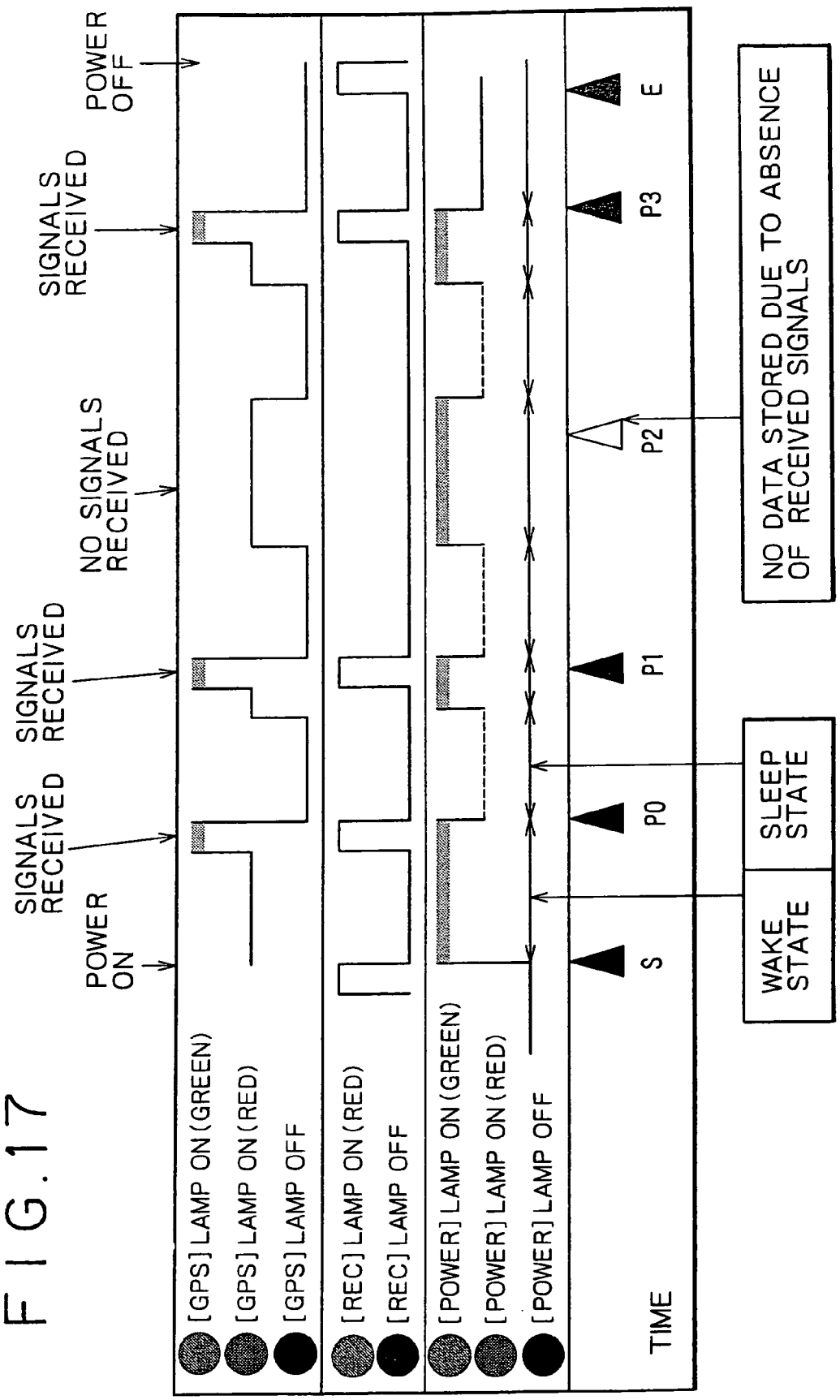
FIG. 17 is a timing chart in effect when the GPS device is activated intermittently.

The storing of log data outlined above is described below in more detail with reference to timing charts in FIGS. 16 through 18. FIG. 16 is a timing chart in effect when log data are stored in the continuous operation process in the storage mode. The GPS device 1 is switched on by operation of the power button 37 at a given point in time. This sets the start flag to 1 and initiates log data storage. In the continuous operation process, log data are stored at intervals of a predetermined interval time.

In FIG. 16, the time interval is thus the same between P0 and P1, between P1 and P2, ..., and between P5 and P6. The GPS lamp 33 is lit green when signals from satellites are normally received, and glows red if the signals are not received normally. As long as the satellite signals are normally received at each predetermined interval time (with the GPS lamp 33 lit green), log data are stored (at P0, P1, P3, P5, P6). If the signals are not normally received (with the GPS lamp 33 glowing red), no log data are stored (at P2, P4).

When log data are normally stored, the REC lamp 34 is lit red. If no log data are recorded, the REC lamp 34 is not illuminated. If the power button 37 is operated to designate removal of power during log data storage, log data with an end flag are stored and the log data storage process comes to and end. The POWER lamp 35 keeps glowing green from the time the start flag is stored until the end flag is set.

The storing of log data by the intermittent operation process in the storage mode will now be described with reference to the timing chart of FIG. 17. As in the case of the continuous operation process, a start flag is set upon power-up and an end flag is set at power-off in correspondence with the log data stored concurrently. The GPS lamp 33 is lit green when the satellite signals are normally received and glows red when the signals are not normally received. During the intermittent operation process, the wake state (with the POWER lamp 35 lit green) and the sleep state (with the POWER lamp 35 blinking red) are alternated. In the wake state, the GPS lamp 33 glows either green or red depending on the status of signal reception as described above. In the sleep sate, the GPS lamp 33 is turned off.

If signals are normally received from satellites in the wake state, log data are stored (at P0, P1, P3). If the satellite signals are not normally received in the wake state (i.e., while the wake time elapses), no log data are stored (at P2). As soon as log data are stored, the sleep state is selected. The immediate resumption of the sleep state is designed to minimize battery power dissipation during the intermittent operation process.

Figure 18:
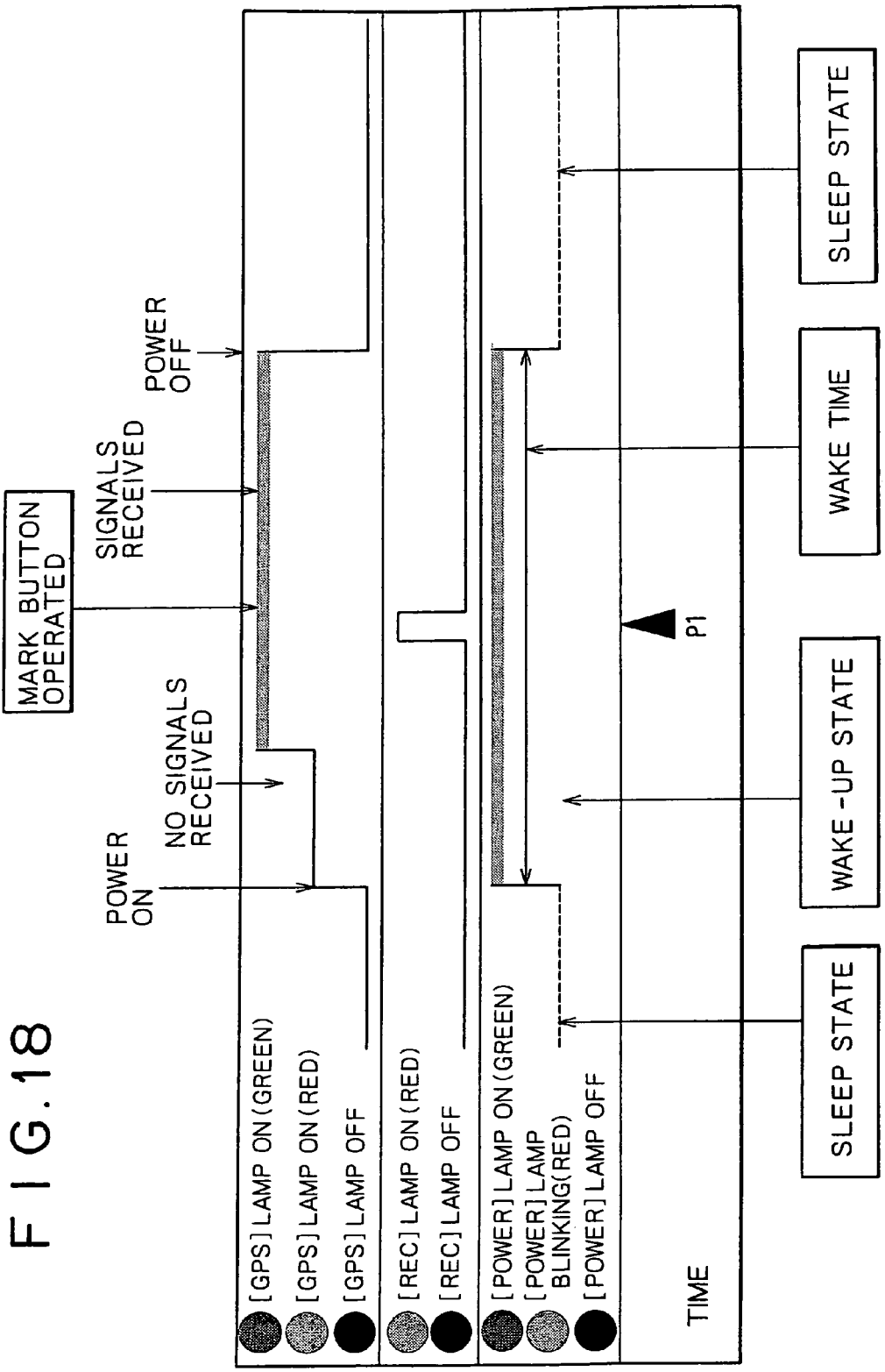
FIG. 18 is a timing chart showing how the GPS device works when the mark button is operated.

Described below with reference to the timing chart of FIG. 18 is the storing of log data by operation of the mark button 36 during the intermittent operation process in the storage mode. Before operating the mark button 36, the user needs to check the status of the GPS device 1. More specifically, the user must check whether the GPS device 1 is switched on and, if the device is found active, must check whether the wake state or the sleep state is in effect.

The checks above may be carried out by viewing the POWER lamp 35. If the POWER lamp 35 is not lit, the user knows that power is still off. In that case, the power button 37 is operated to switch on the GPS device 1. If the POWER lamp 35 is seen blinking red at intervals of four seconds, the user recognizes the sleep state. The power button 37 is then actuated (for less than three seconds) to bring the GPS device 1 into the wake-up state.

FIG. 18 depicts the state transitions outlined above. The user's operation of the power button 37 in the sleep state brings about the wake-up state. In the wake-up state, the GPS lamp 33 starts glowing green if satellite signals are being received and is lit red if the signals are not received, as described. The user checks that the GPS lamp 33 is lit green, before operating the mark button 36. The mark button 36 is operated by the user with his or her express intention to store position information in effect at a particular point in time. Thus the mark button 36 is operated in principle while the GPS lamp 33 is being lit green.

Operating the mark button 37 stores the position information at that point in time. The timing chart of FIG. 18 indicates illustratively that the mark button 36 is operated while the GPS lamp 33 is glowing green. It is presumed, however, that the user can also operate the mark button 36 while the GPS lamp 33 is glowing red.

In the latter case, the user presumably operates the mark button 36 in order to mark (i.e., store) at least the current time while being aware that position information is not obtainable because the GPS lamp 33 is glowing red. In that case, log data are stored which include, as position information applicable to the most recent log data, the time information managed by the counter unit 55 and supplemented by the old flag (with the O/G flag set to 1). Thus the position information is not made up of the data in effect just when the mark button 36 was operated, whereas the time information is constituted by the current time supplied by the counter unit 55.

As described, when certain information is stored by operation of the mark button 36, that information is recorded together with the mark flag (set to 1).

When the storing of log data storage is terminated by operation of the mark button 36, the wake-up state remains in effect until the predetermined wake time expires or until the user operates the power button 37. In the example of FIG. 18, the user operated the power button 37 before the wake time expired.

The GPS device 1 is powered by batteries (located under the battery lid 40) while the above-described log data storing operation is being performed (i.e., when the GPS device 1 is operating alone). The batteries are exhausted progressively and drop eventually to a level too low to sustain log data storage or other operation. Prior to that eventuality, the user must be warned of the reduced battery level.

The control unit 53 (FIG. 6) keeps watching the battery level. If the remaining battery time is judged to have dropped below a predetermined level (e.g., 10 percent of the fully charged state), the control unit 53 sounds a continuous beep sound (bleep, bleep, bleep, . . . ) and causes the POWER lamp 35 to blink red at intervals of 0.3 seconds. The blinking continues until the batteries are totally exhausted or until the user turns off power. The user may establish a desired threshold battery level as a criterion below which the exhausted-battery warning is issued.

The log data thus stored into the storage unit 52 are sent to the personal computer 4 through the USB port 42. Where the personal computer 4 is connected with the GPS device 1 by means of a USB cable, the GPS device 1 is powered by the personal computer 4. How the GPS device 1 works when connected to the personal computer 4 through the USB will now be described by referring to a flowchart in FIG. 19.

Figure 19:
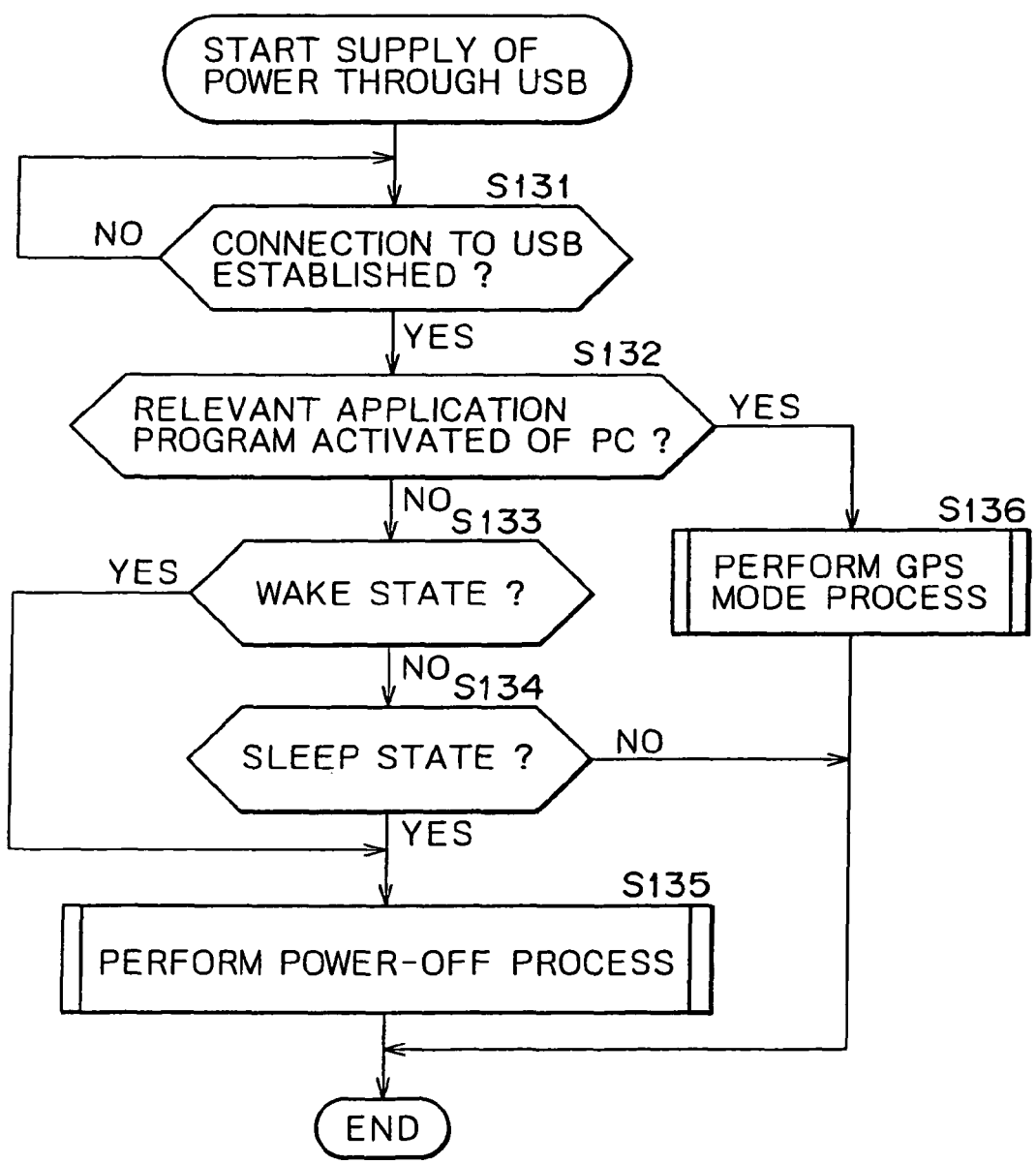
FIG. 19 is a flowchart of steps performed by the GPS device connected to the personal computer.

In step S131 of FIG. 19, the control unit 53 checks to see if a USB cable (not shown) is connected to the USB port 42. Step S131 is repeated until the USB cable is judged connected to the USB port 42. When thus connected, the personal computer 4 powers the GPS device 1. In order to minimize power dissipation of the personal computer 4, the computer is arranged to power the GPS device 1 only when the latter needs to be powered. Thus in step S132, a check is made to see if an application program requiring data from the GPS device 1 has been started up on the personal computer 4.

If in step S132 the relevant application program is not judged to be activated, step S133 is reached. In step S133, a check is made to see if the wake state is selected (including a wake state brought about while the wake-up state is in effect). If in step S133 the wake state is judged to be selected, step S135 is reached. If the wake state is not judged to be in effect in step S133, step S134 is reached.

In step S134, a check is made to see if the GPS device 1 is in the sleep state. If in step S134 the sleep state is judged to be in effect, step S135 is reached. Control is passed on to step S135 in one of two ways: when the wake state was judged to be selected in step S133, or when the sleep state was judged to be in effect in step S134. This is a stage where the GPS device 1 is being switched on.

When the user connects the GPS device 1 to the personal computer 4, it is presumed that the GPS device 1 is to be utilized in the GPS mode or in the PC mode. This necessitates terminating the wake state or sleep state that is a state for data storage. Thus a power-off process is carried out in step S135. The power-off process has already been discussed and will not be described here further.

If in step S134 the sleep state is not judged to be in effect, i.e., if the GPS device 1 is judged turned off, then the processing of FIG. 19 comes to and end.

Figure 20:
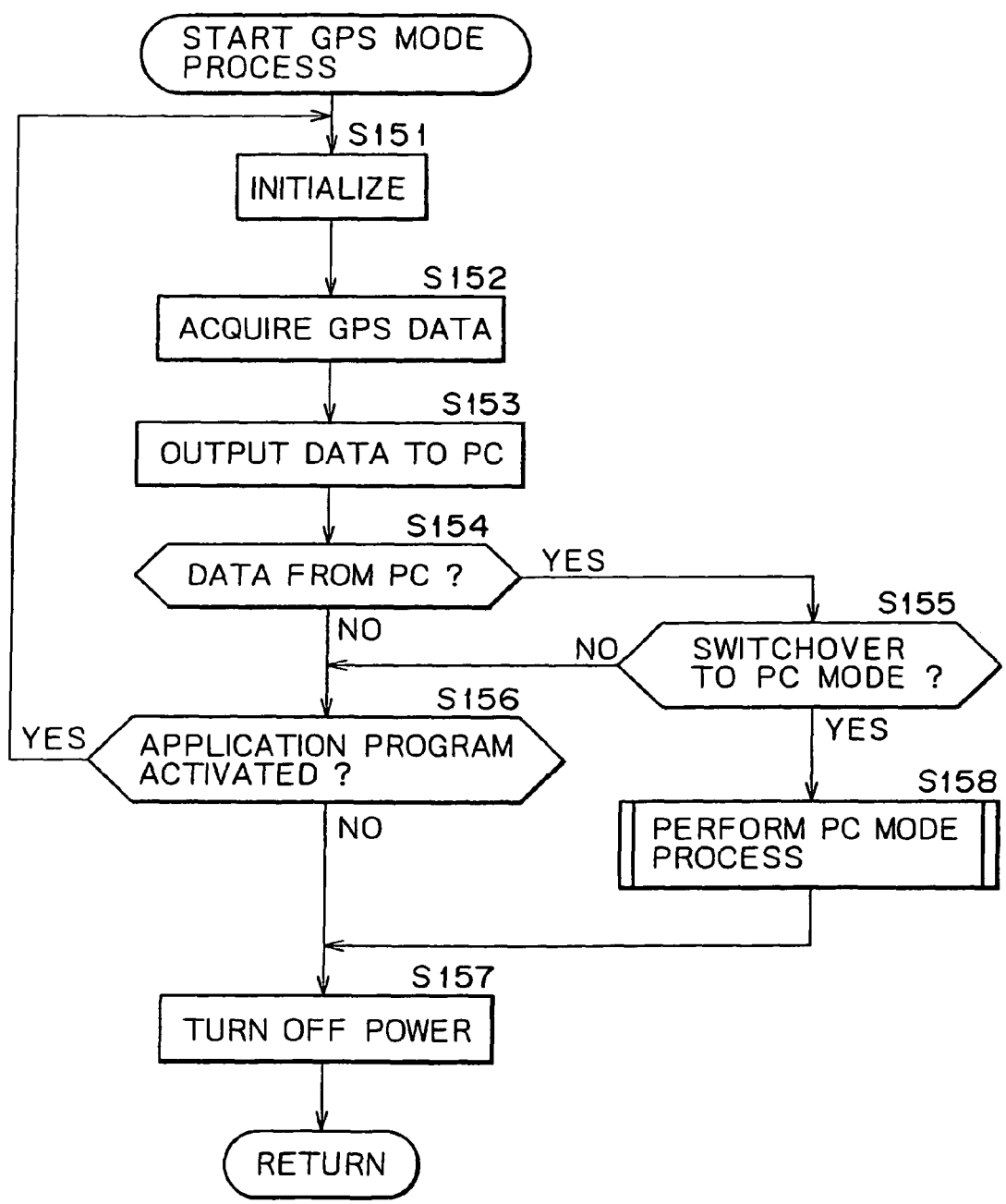
FIG. 20 is a flowchart of steps detailing the process in step S136 of FIG. 19.

If in step S132 the relevant application program is judged to be active on the personal computer 4, step S136 is reached for a GPS mode process. FIG. 20 is a flowchart of steps detailing the GPS process.

In step S151 of FIG. 20, the GPS device 1 is initialized preparatory to starting the GPS mode process. The initialization illustratively involves suitably setting the switches 61 and 62 (FIG. 7) and making arrangements to receive the supply of power from the personal computer 4. In step S152, GPS data start getting acquired. In step S153, the switches 61 and 62 are operated so as to output signal information received via the antenna 31 to the personal computer 4 through the USB port 42.

In step S154, a check is made to see if any data are input from the personal computer 4. Basically, the GPS device 1 in the GPS mode only supplies position and time information to the personal computer 4 and receives no data therefrom. If in step S154 any data are judged to be output by the personal computer 4 to the GPS device 1, that means the user wants to operate the GPS device 1 by means of the personal computer 4. In other words, the user's desire to switch to the PC mode is recognized. Thus if any data from the personal computer 4 are detected in step S154, step S155 is reached.

In step S155, a check is made to see if the data from the personal computer 4 specify a switchover to the PC mode. If in step S155 the data from the personal computer 4 are not judged to be something designating a switchover to the PC mode, then the data are regarded as irrelevant to the GPS device 1 and step S156 is reached. Step S156 is also reached when no data are judged to be admitted from the personal computer 4.

In step S156, a check is made to see if the relevant application program has been activated. If control has been passed on to the GPS mode process outlined in FIG. 20 (i.e., process of step S136 in FIG. 19), that means the application program utilizing the GPS device 1 as a GPS antenna has been started up. The check in step S156 is intended to keep constantly watching whether the relevant application program is active.

In judging that the relevant application program is off, the above check in step S156 allows the GPS device 1 to be turned off to minimize power dissipation since the GPS device is currently not needed. Turning off the GPS device 1 cuts off the supply of the currently unnecessary power from the personal computer 4, which translates into savings of power resources in the computer 4.

Thus if the relevant application program is judged to be inactive in step S156, step S157 is reached in which the GPS device 1 is switched off. If in step S156 the application program is judged to be on, step S152 is reached again and subsequent steps are repeated (i.e., the GPS mode is maintained).

Figure 21:
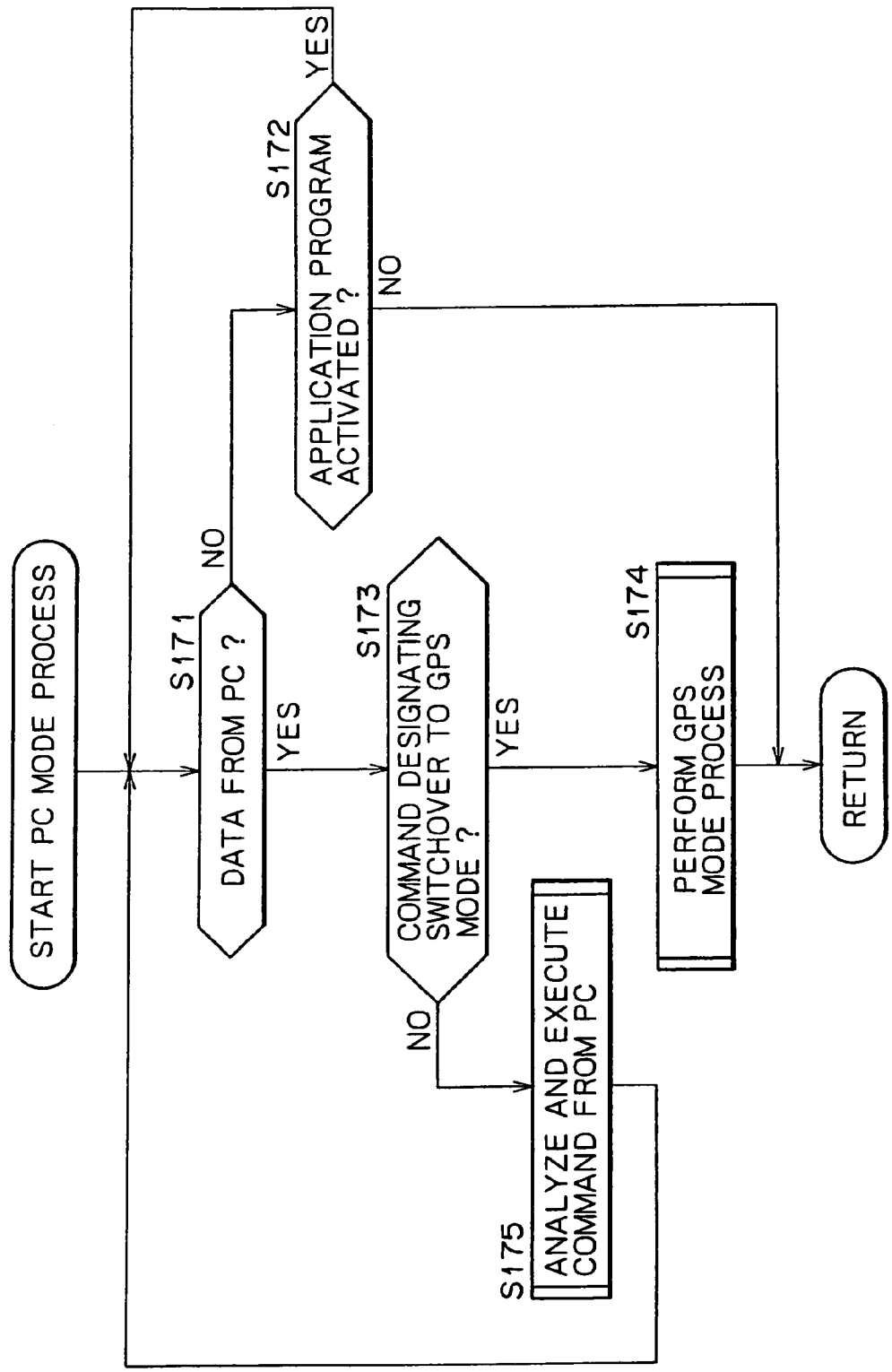
FIG. 21 is a flowchart of steps detailing the process in step S158 of FIG. 20.

If in step S155 the input data are judged to be those specifying a switchover to the PC mode, step S158 is reached in which a PC mode process is performed. FIG. 21 is a flowchart of steps detailing the PC mode process. In step S171 of FIG. 21, a check is made to see if any data are input from the personal computer 4. If in step S171 no data are judged to come from the personal computer 4, step S172 is reached.

In step S172, a check is made to see if the application program relevant to the GPS device 1 has been started up on the personal computer 4. This process is the same as that in step S156 of FIG. 20 and thus will not be discussed further. Whatever mode is currently in effect, constant checks are made on whether or not the application program relevant to the GPS device 1 is active so as to minimize power dissipation both in the personal computer 4 and in the GPS device 1.

If in step S172 the relevant application program is judged to be on, step S171 is reached again and subsequent steps are repeated (i.e., the PC mode is maintained). If the relevant application program is judged to be off in step S172, step S157 (of FIG. 20) is reached and the GPS device 1 is switched off.

If in step S171 any data are judged to be input from the personal computer 4, a check is made to see if the input data constitute a command designating a switchover to the GPS mode. If in step S171 the data are judged to be the command specifying transition to the GPS mode, step S174 is reached for a GPS mode process. The GPS mode process is constituted by the steps making the flowchart in FIG. 20. Thus from step S174, control is returned to step S151 (of FIG. 20) and subsequent steps are repeated.

Figure 22:
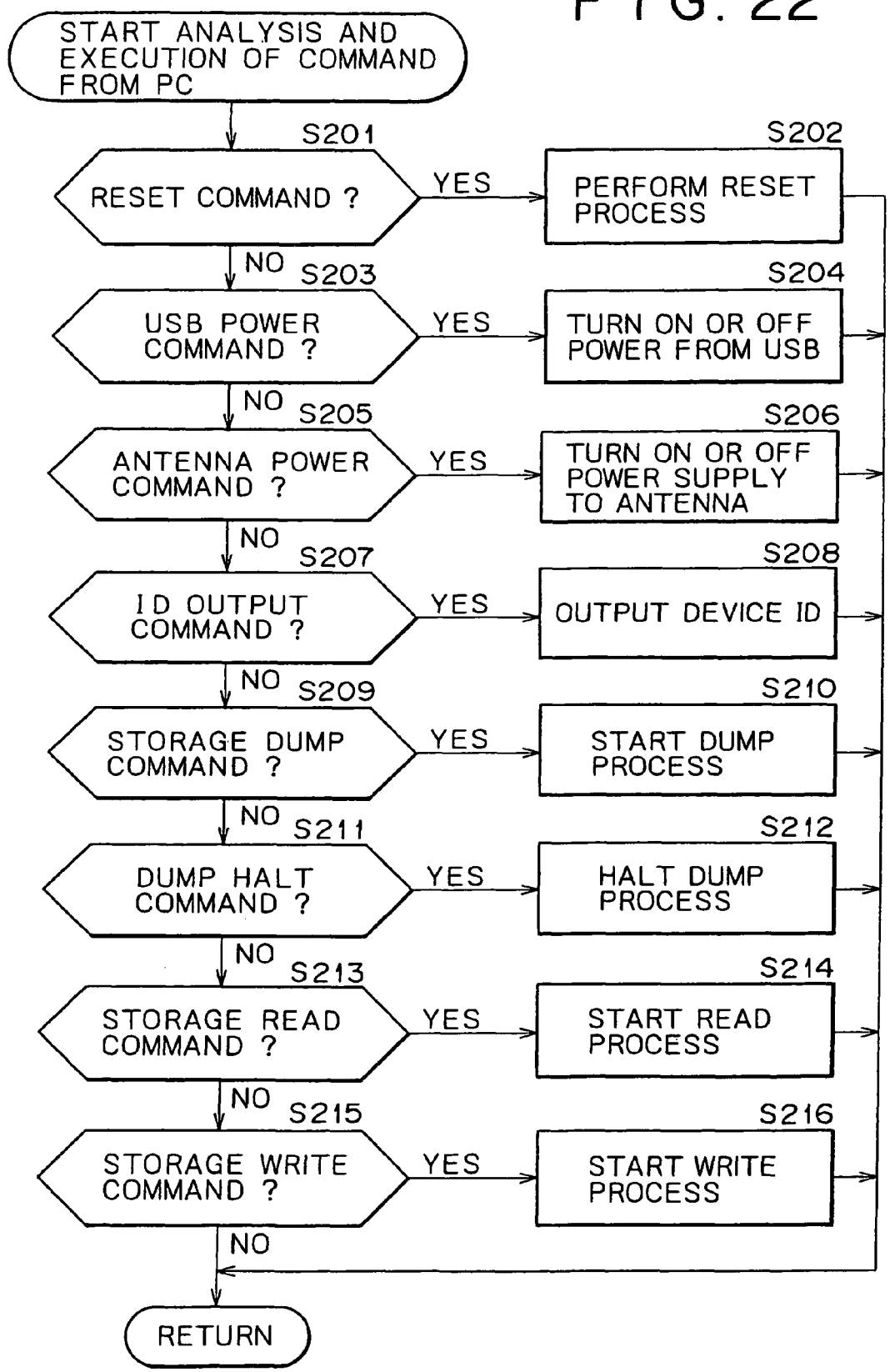
FIG. 22 is a flowchart of steps detailing the process in step S175 of FIG. 21.

If in step S173 the input data are not judged to constitute a command designating a switchover to the GPS mode, step S175 is reached for a command analysis and execution process in which the command from the personal computer 4 is analyzed and the operation specified thereby is carried out. FIG. 22 is a flowchart of steps detailing the process of analyzing and executing the command from the personal computer 4.

In step S201 of FIG. 22, a check is made to see if the command is a reset command. If the command is judged to be a reset command, step S202 is reached for a reset process. As described above, the GPS device 1 has a plurality of parameters such as those defining the sleep time and wake time. These parameters may be set as desired by the user. The reset process, when carried out, resets the user-defined parameters to the default parameter values.

If in step S201 the command is not judged to be the reset command, step S203 is reached. In step S203, a check is made to see if the command is a USB power command. If in step S203 the command is judged to be one related to the supply of power through the USB, step S204 is reached. In step S204, the supply of power through the USB is turned on or off as designated by the command.

If in step S203 the command is not judged to be the USB power command, step S205 is reached. In step S205, a check is made to see if the command is an antenna power command. If in step S205 the command is judged to be one related to the supply of power to the antenna 31, step S206 is reached. In step S206, the supply of power to the antenna 31 is turned on or off as specified by the command.

If in step S205 the command is not judged to be the antenna power command, step S207 is reached. In step S207, a check is made to see if the command is an ID output command. If in step S207 the command is judged to be one designating the output of a device ID, step S208 is reached in which an ID code unique to the GPS device 1 in question is output.

If in step S207 the command is not judged to be the ID output command, step S209 is reached. In step S209, a check is made to see if the command is a storage dump command. If in step S209 the command is judged to be one designating a dump of the storage unit 52, step S210 is reached in which a dump process is started. The dump may be halted halfway. Thus if in step S209 the command is not judged to be the storage dump command, step S211 is reached in which a check is made to see if the command is a dump halt command.

If in step S211 the command is judged to be the dump halt command, step S212 is reached for a dump halt process. If in step S211 the command is not judged to be the dump halt command, step S213 is reached. In step S213, a check is made to see if the command is a read command. If in step S213 the command is judged to be one designating a read operation from the storage unit 52, step S214 is reached. In step S214, the data designated by the command are read from the storage unit 52.

If in step S213 the command is not judged to be the read command, step S215 is reached. In step S215, a check is made to see if the command is a write command. If in step S215 the command is judged to be one designating the writing of data to the storing unit 52, step S216 is reached. In step S216, the data designated by the command are written to the storage unit 52.

The command analysis outlined in FIG. 22 is only an example and may be replaced by variations embracing other commands provided to execute varieties of processes. The flowchart in FIG. 22 thus describes in an illustrative fashion how any of such commands from the personal computer 4 is typically analyzed and how a relevant process is carried out in accordance with the result of the analysis.

The processing of FIG. 22 is performed every time a command is input. At the end of the processing in FIG. 22, step S171 of FIG. 21 is reached again and subsequent steps are repeated. Upon completion of the processing in FIG. 21, step S157 of FIG. 20 is reached and the GPS device 1 is switched off. When the processing of FIG. 20 is terminated, the processing of FIG. 19 is also brought to an end. When the GPS device 1 is connected to the personal computer 4 through the USB, the steps in FIGS. 19 through 22 are carried out as described above.

Figure 23:
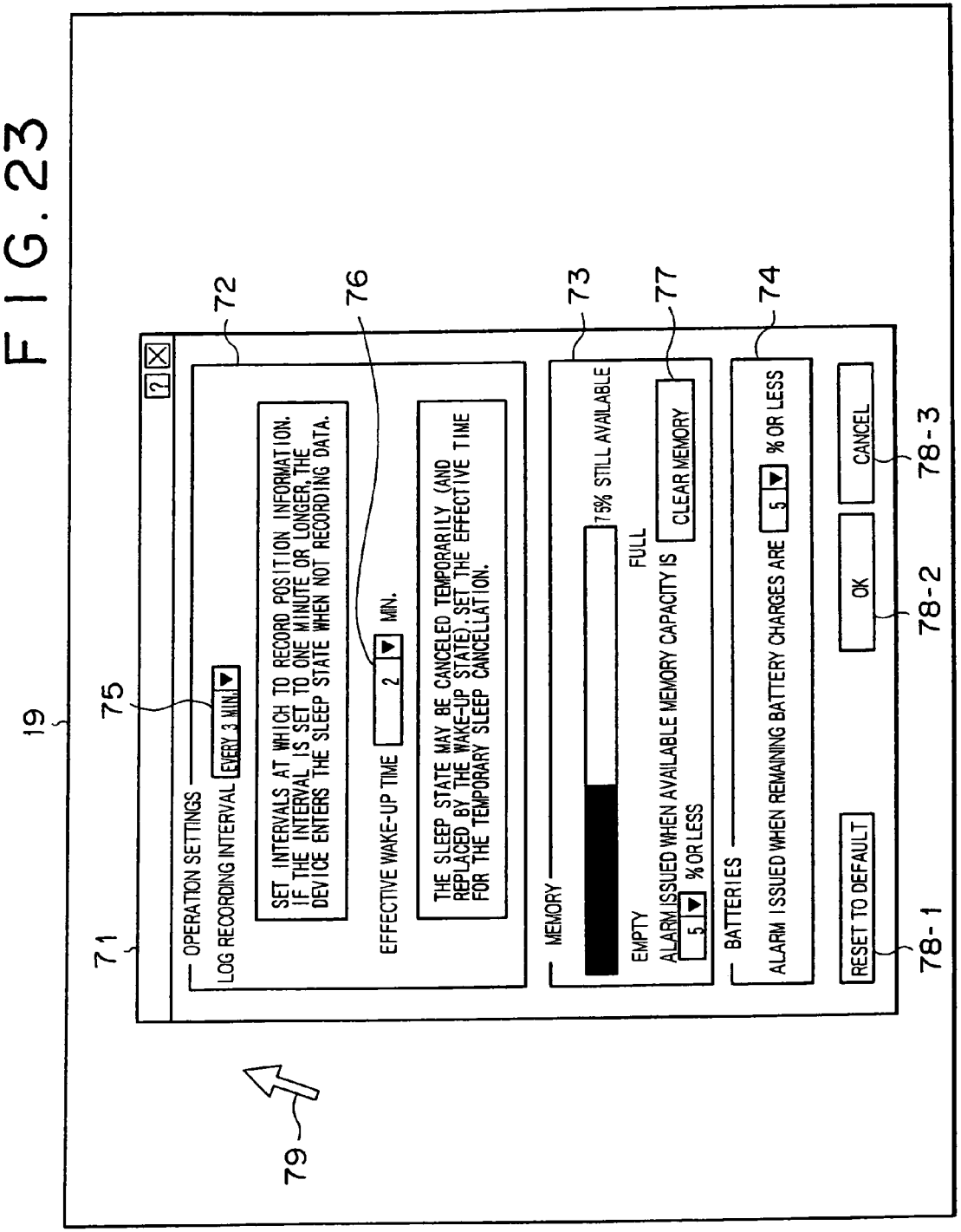
FIG. 23 is a schematic view of a typical screen appearing on a display 19.

In order to output a desired command illustratively in the manner outlined in FIG. 22, the user is required to perform necessary operations on a screen of the display 19 of the personal computer 4. FIG. 23 shows a typical screen on which such operations are carried out.

On the display 19, a setting window 71 appears on which to operate (i.e., set) parameters for determining the way the GPS device 1 should operate. The setting window 71 is made up of three major portions: an operation setting area 72, a memory setting area 73, and a battery setting area 74. The operation setting area 72 comprises an interval setting field 75 in which to set a log storage interval, and an effective time setting field 76 in which to set an effective wake-up time.

The memory setting area 73 is constituted by an alarm setting field and a clear button 77. The alarm setting field allows the user to set a threshold percentage of the remaining memory capacity (of the storage unit 52) as a criterion below which an alarm is issued. The clear button 77 is operated to clear all stored log data. As described earlier, log data keep being written to the storage unit 52 unless erased intentionally by the user. To ensure a sufficient writable capacity, the user should operate the clear button 77 periodically to clear the storage unit 52.

The battery setting area 74 constitutes a field in which to set a threshold percentage of the remaining battery charges as a criterion below which an alarm is issued. Under the battery setting area 74 are three buttons: a reset-to-default button 78-1, an OK button 78-2, and a cancel button 78-3. The reset-to-default button 78-1 is operated to reset the user-established parameters to the default values. The OK button 78-2 is operated to confirm the end of the parameter setting. The cancel button 78-3 is operated to cancel any parameters that have been set so far but are considered unnecessary, or to close the setting window 71.

Figure 24:
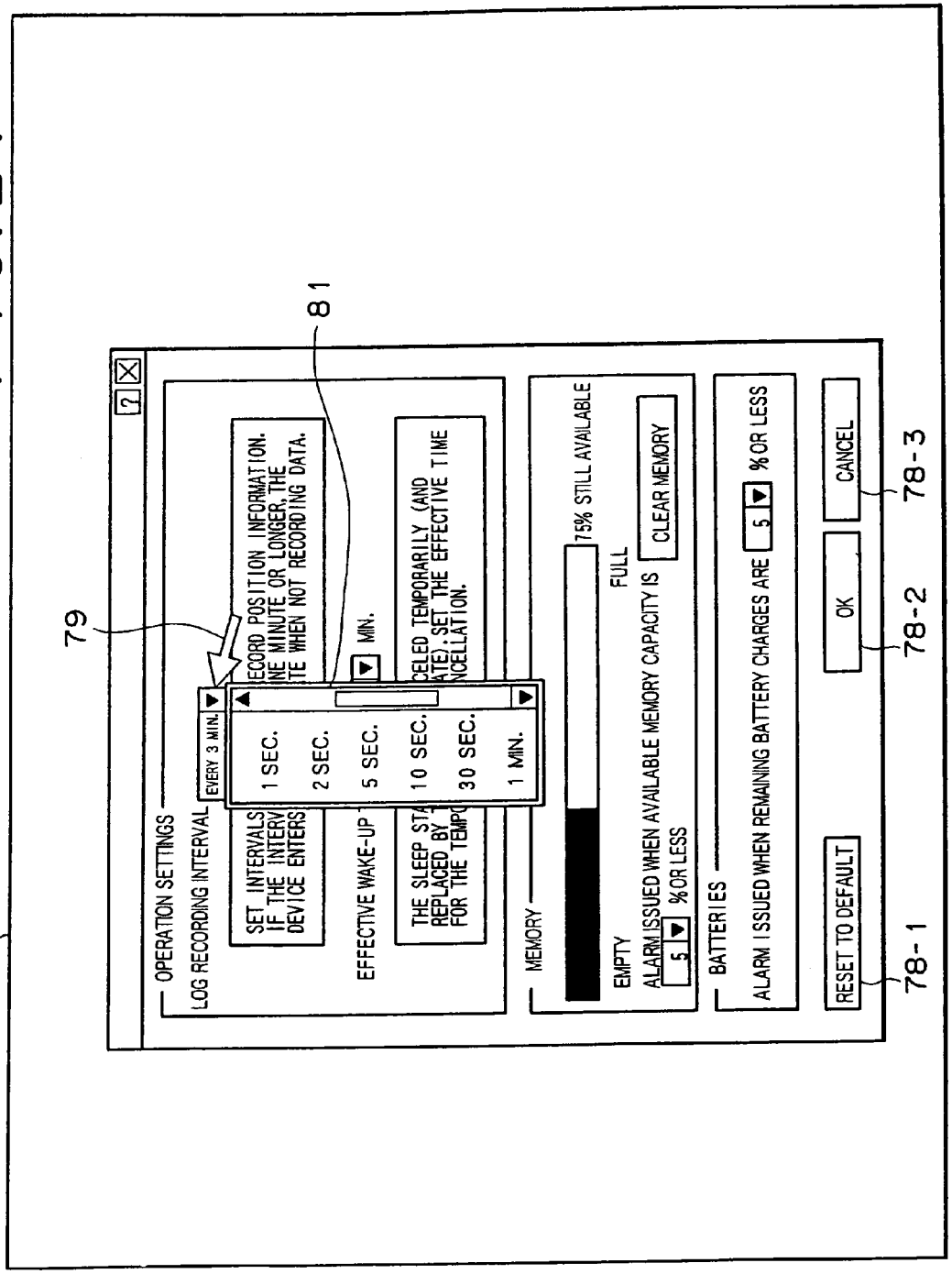
FIG. 24 is a schematic view of a typical screen that appears when an interval setting field is operated.

In setting parameters in various areas or fields, the user points a cursor where desired on the screen by operating the mouse 16 (FIG. 2) or a similar pointing device and by clicking on or otherwise manipulating the device. For example, the user may point a cursor 79 to the interval setting field 75 by operating and clicking on the mouse 16. This causes a pull-down menu 81 to appear as shown in FIG. 24. The menu 81 indicates values that may be used as an interval for log storage. A scroll bar appears on the right-hand side of the pull-down menu 81, allowing the user to display the hidden values when operated.

Illustratively, the log storage interval may be set for any one of 1 second, 3 seconds, 5 seconds, 10 seconds, 30 seconds, 1 minute, 3 minutes, 5 minutes, 10 minutes, 30 minutes, and 60 minutes (1 hour). The pull-down menu 81 may be arranged to contain a field in which any other time period may be set as desired. In setting the interval, the user should take into account the circumstances under which log data are to be stored. For example, if log data are expected to be recorded during walking, the moving speed is not very high so that a relatively long interval of, say, 10 or 30 minutes may be selected. If log data are expected to be stored during a trip by car, the moving speed is high and thus a relatively short period of, say, 30 seconds or 1 minute should be selected to keep frequent logs.

Other parameters may also be set in like manner. Obviously, arrangements may be made not merely to pick one of the values contained in the pull-down menu 81 but to point the cursor 81 to the field in question so that the currently displayed value may be directly changed as desired.

Every time the OK button 78-2 is operated, the data denoting the established parameter(s) are output from the personal computer 4 to the GPS device 1. In such a case, the GPS device 1 receives a write command requiring the old parameter value(s) to be replaced by the newly established parameter(s). More specifically, in step S215 of FIG. 22, the received command is judged to be one designating a write operation to the storage unit 52. Step S215 is followed by step S216 in which the parameter value(s) is written to the storage device accordingly.

Figure 25:
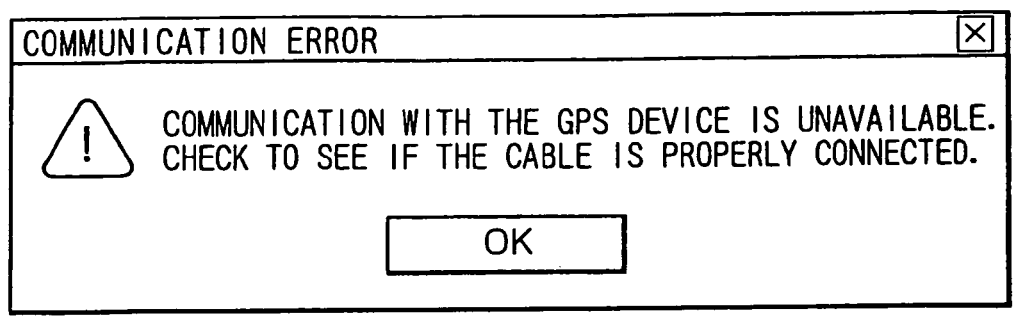
FIG. 25 is a schematic view of a typical error message generated in case of an error during data exchanges between the personal computer and the GPS device.

In case an error occurs for some reason during data exchanges between the personal computer 4 and the GPS device 1, an error message such as is shown in FIG. 25 appears on the display 19.

The setting window 71 is not limited in design to what is shown in FIG. 23; any other design may be adopted instead. A plurality of setting windows are provided in which to operate and set up the GPS device 1. Although not shown, there is provided a window by which to dump log data from the storage unit 52 of the GPS device 1 to the HDD 18 (FIG. 2) of the personal computer 4. If that dump window is opened and operated by the user for a dump, a data transfer indication window such as one in FIG. 26 appears on the display 19 to indicate the data transfer status.

Figure 26:
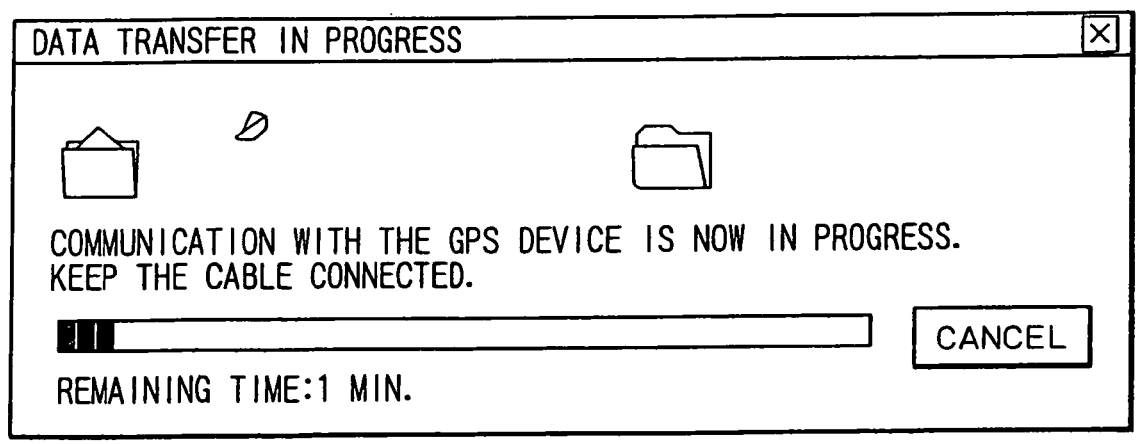
FIG. 26 is a schematic view of a data transfer indication window that appears during data exchanges between the personal computer and the GPS device.

If the user operates the cancel button in the window of FIG. 26, the GPS device 1 interprets the action as a dump halt command in step S211 of FIG. 22. Step S211 is followed by step S212 in which the dump process is halted. As a result, the data transfer indication window of FIG. 26 disappears.

As described, the log data including position and time information and stored in the GPS device 1 may be supplied to the personal computer 4. On the personal computer 4, the user can edit, in conjunction with the supplied log data, the image data captured by the digital camera 2 (FIG. 1) and recorded on the floppy disk 3.

Figure 27:
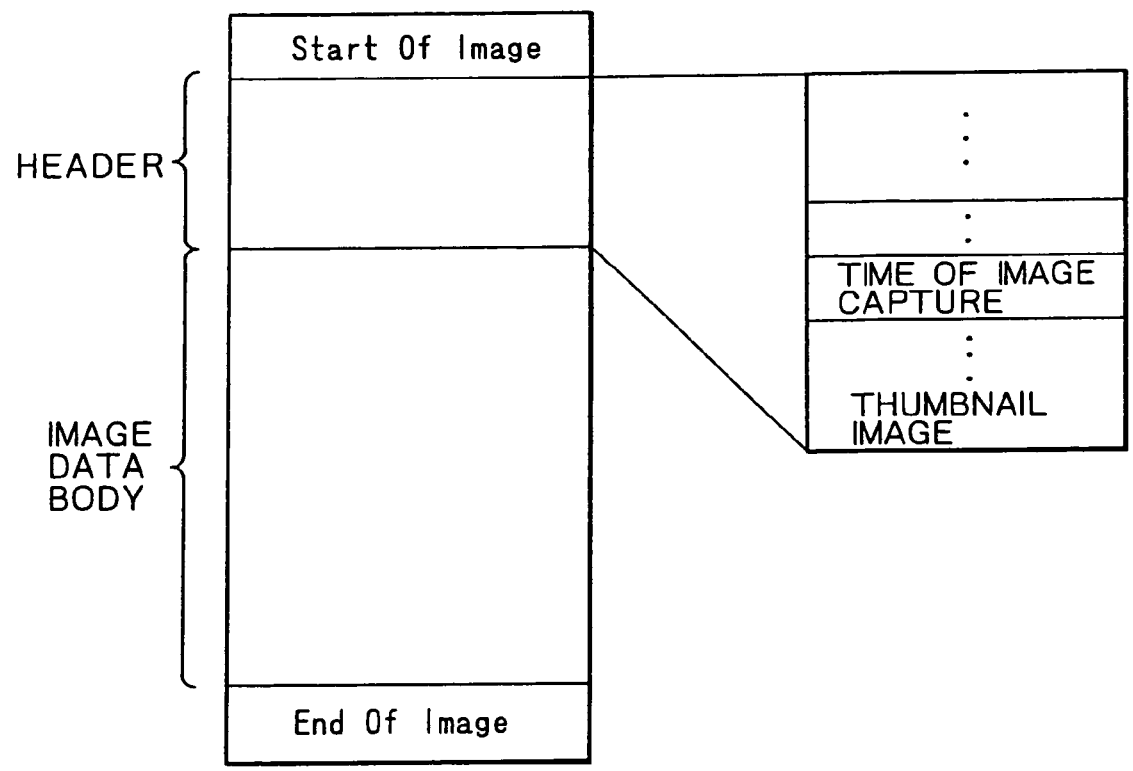
FIG. 27 is an explanatory view of a typical image file structure.

When recording image data, the digital camera 2 associates data making up each image with a time stamp illustratively using a digital camera format DCF (Design rule for Camera File) defined by the JEIDA (Japan Electronic Industry Development Association). More specifically, as shown in FIG. 27, an image file accommodating an image taken by the digital camera 2 is constituted mainly by a header and an image data body. The header stores data about the image held in the image data body. One of the data items making up the header is a time of day at which the image in question was captured.

Figure 28:
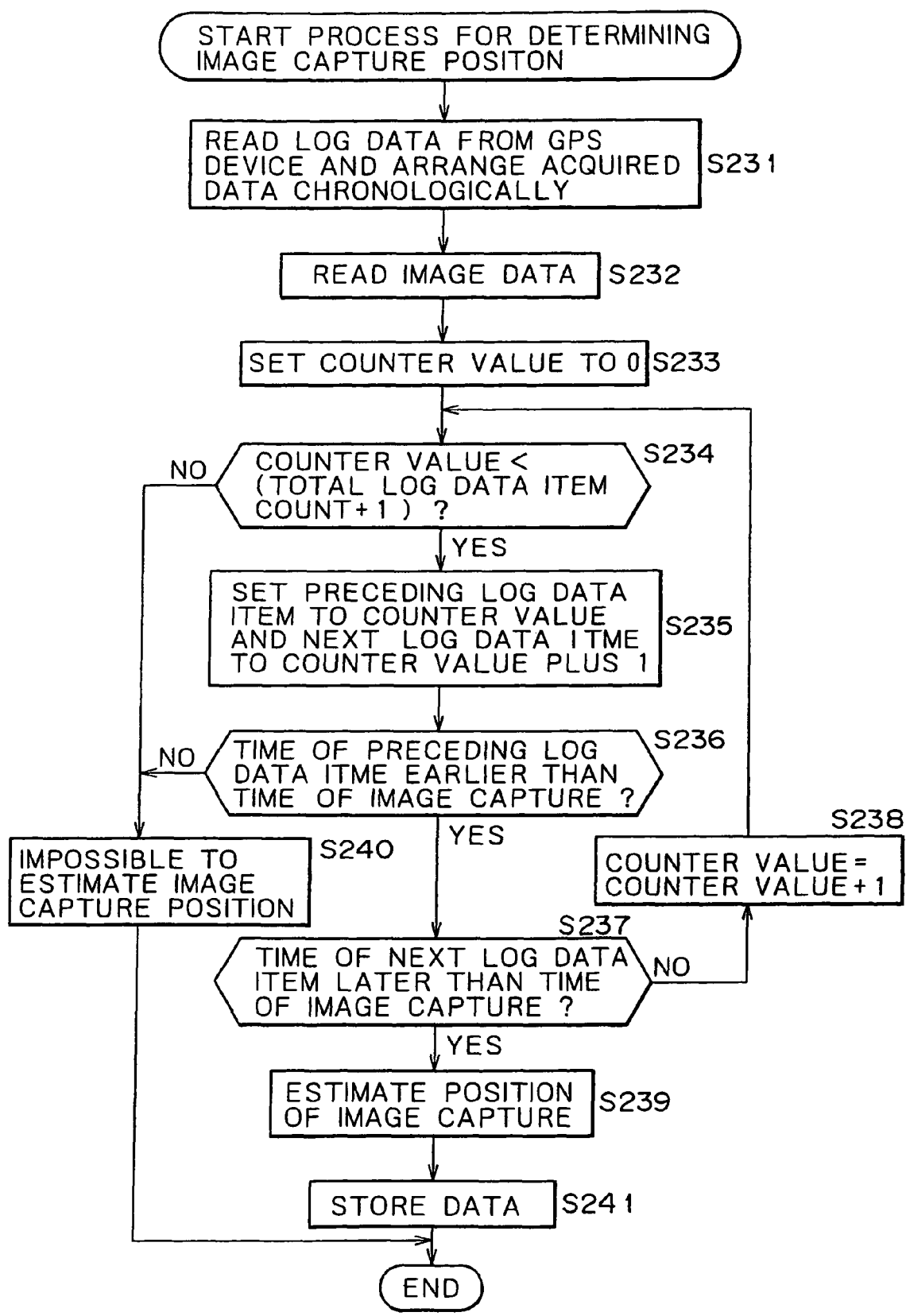
FIG. 28 is a flowchart of steps performed by the personal computer 4 when specifying positions where image data were acquired.

Described below with reference to a flowchart of FIG. 28 is how the personal computer 4 operates in determining the position where a specific image was taken by the digital camera 2. In step S231 of FIG. 28, the personal computer 4 reads log data from the GPS device 1 connected via the USB. The log data thus read out are placed illustratively into the RAM 13 (FIG. 2). When written to the memory, the log data are arranged in the ascending order of chronology. Each log data item is furnished with a counter value starting at zero. FIG. 29 depicts an example of log data placed into the personal computer 4.

The log data in FIG. 29 are made up of 32 log data items. The log data constitute a group of data items recorded from the time the GPS device 1 was turned on until it was switched off. In other words, a log data group starts with a log data item whose start flag is set to 1 and ends with a log data item whose end flag is at 1. Of the data items constituting the log data body in FIG. 29, only those composed of a time stamp each are shown. The times are seen here taken at intervals of 30 seconds from 10:18:00 to 10:33:30. The log data items, numbered with counter values 0 through 31, are arranged chronologically on the basis of the time data held in the log data body.

In step S232, the data constituting a target image to be processed are read. The read operation is performed as follows: from that floppy disk 3 in the FDD 17 (or from the portable semiconductor memory 5 or a remote source over a network) which holds image data taken by the digital camera 2, image data having the data structure shown in FIG. 27 are read into the RAM 13 or onto the HDD 18. At this point, all image data may be read from the floppy disk 3 and placed illustratively into the RAM 13 before the data making up the target image is retrieved from the RAM 13. Alternatively, the image data may be read one image at a time from the floppy disk 3.

In step S233, the counter value regarding the log data to be processed is initialized to zero. In step S234, a check is made to see if the counter value is less than the number of all log data items plus one. In other words, it is determined whether all log data items are subject to the processes in step S234 and subsequent steps. In this case, the counter value has just been set to zero and thus it is judged to be less than the total log data item count plus one, so that step S235 is reached.

In step S235, the "preceding" log data item is set to the counter value and the "next" log data item is set to the counter value plus one. The preceding and the next log data items are chronologically adjacent to each other (i.e., having consecutive counter values), the preceding log data item being earlier by one time increment than the next log data item. In step S236, a check is made to see if the time of the preceding log data item was earlier than the time at which the image was taken. In other words, it is determined whether the time stamp of the preceding log data item represents a time of day previous to the time included in the target image data to be processed read in step S232.

If in step S236 the time stamp of the preceding log data item is judged to be earlier than the time of the image capture, step S237 is reached. In step S237, a check is made to see if the time stamp of the next log data item is subsequent to the time of the image capture. If in step S237 the next log item is not judged to be subsequent to the time of the image capture, step S238 is reached in which the counter value is incremented by one. Regarding the log data having the newly established counter value, the processes of step S234 and subsequent steps are repeated.

If in step S237 the time stamp of the next log data item is judged to be later than the time of the image capture, step S239 is reached. In step S239, the position where the image was taken is estimated. How the position of the image capture is typically estimated is described below with reference to FIG. 30. If the time of the image capture is, say, "10:32:40," then the process of step S236 judges that the log data items with counter values 0 through 28 (from "10:18:00" to "10:32:00") have time stamps each preceding the time of the image capture. In step S237, the next log data item is not judged to have a time subsequent to that of the image capture. Thus steps S234 through S238 are repeated.

When the counter value reaches 29 (i.e., when the preceding log data item is associated with the time stamp of "10:32:30" and the next log data item with "10:33:00"), the process of step S236 judges the time of the preceding log data item to be earlier than the time of the image capture. In step S237, the time of the next log data item is judged to be later than the time of the image capture. This is the state shown in FIG. 30 in which the time of the image capture is situated between two log data items.

In this example, the time of the image capture is "10:32:40," preceded by the preceding log data item with the time of "10:32:30" and followed by the next log data item with the time of "10:33:00." Where the two log data items and the time of the image capture are plotted on the time base as sketched in FIG. 30, the point indicating the time of the image capture is considered to divide internally a line segment connecting the two points representing the two log data items. If the point denoting the time of the image capture is assumed to divide, in proportions of 1:2, the distance between the two points representing the two log data items, then the position of the image capture can be estimated on the basis of the position information representing the two log data items.

In the example above, the position information on the log data item with the time of "10:32:30" is constituted by N42° 32'35" and E135° 12'20", whereas the position information about the log data item having the time of "10:33:00" is made of N42° 35'35" and E135° 00'40". Because of the assumption that the position information spanning the two positions of the log data items is internally divided in proportions of 1:2, the north latitude (N) of the position of the image capture is estimated at N42° 33'35". Based on the same assumption, the east longitude (E) of the position of the image capture is estimated at E135° 04'20". The estimates carried out as described above in step S239 determine the position of the image capture corresponding to the image capture time.

There may be a case in which the time of the image capture matches the time of a given log data item, i.e., the case where the proportions of internal division are 0:X (X is a value contingent on the storage interval between log data items). In that case, the position information about the log data item in question is estimated to represent the position where the target image data were acquired.

In terms of log data storage intervals, the GPS device 1 works as described in one of two modes: continuous mode in which log data are stored every second, and intermittent mode in which log data are recorded at intervals of up to 3,600 seconds (1 hour). Due to obstacles, the GPS device 1 may sometimes be unable to receive signals normally from satellites (i.e., unable to store log data containing accurate position information). If signals from satellites are not received in the intermittent mode or because of obstacles, there are no log data available containing position information corresponding to (i.e., matching) the times of day at which image data were acquired. Such eventualities can be overcome by estimating the position of the image capture in the manner described above.

When the image capture position is estimated (i.e., determined) in step S239, step S241 is reached. In step S241, the data representing the image capture position are associated with the target image data to be processed before they are all written illustratively to the HDD 18.

Suppose that in step S234 the counter value is judged to be larger than the total log data item count plus one, or that in step S236 the time of the preceding log data item is not judged to be earlier than the time of the image capture (since comparison with the image capture times proceeds chronologically, the judgment that the time of the preceding log data item was not earlier than the time of the image capture signifies that all log data items are subsequent to the image capture time). In such cases, step S240 is reached.

In step S240, it is judged that the position of the target image data to be processed cannot be estimated. In step S241, the image data are stored together with a data item indicating the absence of estimates about the image capture position.

In the foregoing description, two log data items closest chronologically to the time of the image capture were shown retrieved before estimates of an image capture position were carried out. Alternatively, there may be provided a step in which to search for a log data item whose time matches an image capture time. Estimates of the image capture position are performed only in the absence of any matching log data item.

The image data thus associated with specific positions of the image capture may be displayed as thumbnail images at the corresponding positions on a digital map, or may be grouped into suitable zone categories according to the position information. Such editing work is carried out by use of an appropriate application program. If certain image data are displayed on the digital map and if the position information associated with that image has been acquired intentionally by the user (i.e., if the position information is derived from specific log data stored by the user's operation of the mark button 36), then an indication attesting to the user's choice may be displayed as needed.

The log data need not be limited in their use to being associated with image data. Alternatively, the log data may be sorted out chronologically and plotted on a digital map in the sorted order. The data thus plotted provide a track traveled by the user.

The examples above have been shown centering on how to deal with still pictures obtained by the digital camera 2. However, this is not limitative of the invention. The invention also applies to moving picture data captured by a digital video camera or like equipment. In practicing satellite-based position measurement, the GPS may be replaced by the GLONASS (Global Orbiting Navigation Satellite System).

The processes discussed above may be implemented either by hardware or by software. If a series of processes is implemented by software, programs constituting the software are loaded from a program storage medium into a computer having a hardware structure dedicated to the software or into a general-purpose personal computer capable of executing diverse functions based on various programs that may be installed therein.

The program storage medium from which to load programs into the personal computer 4 for execution may be any one of such media as magnetic disks 131 (including floppy disks), optical disks 132 (including CD-ROM (Compact Disc-Read Only Memory) and DVD (Digital Versatile Disc)), a semiconductor memory 134 or like package medium, and a hard disc drive constituting a ROM 112 or a storage unit 118 into which programs are stored temporarily or permanently. Programs are stored onto the program storage medium from wired or wireless communication media such as local area networks, the Internet, or digital satellite broadcast links through such interfaces as routers and modems where necessary.

In this specification, the steps in which to describe the programs offered by the program storage medium may or may not be carried out chronologically in the described sequence. These steps include processes that may be executed in parallel or on an individual basis.

In this specification, the term "system" refers to a totality of multiple devices configured.

To sum up, as described above and through the use of an information processing method, an information processing apparatus and a program storage medium according to the invention, measured position information is first stored in association with first time information representing times of day at which the measured position information was obtained. Video information is then stored in association with second time information representing times of day at which the video information was obtained. A search is made to retrieve the first time information closest to the second time information so that the measured position information corresponding to the retrieved first time information is associated with the video information corresponding to the second time information. The inventive method and apparatus thus allow users to edit video information more easily than before.

Furthermore, as described and through the use of another information processing apparatus, another information processing method and another program storage medium according to the invention, a command is provided to read log data from a device which stores the log data associating measured position data with time data. The command, when input, causes the log data to be retrieved from the device. Positions based on the measured position data included in the retrieved log data are then plotted on an electronic map. Users can thus trace measured positions on the map whenever desired.

As many apparently different embodiments of this invention may be made without departing from the spirit and scope thereof, it is to be understood that the invention is not limited to the specific embodiments thereof except as defined in the appended claims.

What is claimed is:

1. An information processing apparatus comprising:
   a storing device configured to store data items which include measured position information in association with position time information at which the measured position information is obtained, wherein the measured position information and the position time information are obtained at predetermined intervals;
   a transferring device configured to transfer the stored data items from the storing device to a recording device;
   the recording device configured to receive and record the data items from the storing device, and to receive and record image data from an external imaging device, the image data including image time information indicating a time of acquiring the image data at the external imaging device; and
   a matching unit configured to compare the image time information included in the image data with the position time information included in the data items,
   wherein when the compared image time information and position time information match, a position of the external imaging device at the time of acquiring the image data is estimated on the basis of a measured position information associated with the matching position time information, and when the compared image time information and position time information do not match, the position of the external imaging device at the time of acquiring the image data is estimated on the basis of at least two measured position information associated with at least two respective position time information corresponding to the image time information.

2. The information processing apparatus according to claim 1, wherein the storing device is further configured to store mark information in addition to the measured position information and position time information which are recorded at predetermined intervals, the mark information being one of the stored data items and including measured position information and position time information which are measured upon a user's input command.

3. The information processing apparatus according to claim 2, further comprising:
a mark operation device configured to record an indication of storage of the measured position information by operation thereof, wherein
the mark information indicates whether the mark operation device has been operated.

4. The information processing apparatus according to claim 1, the recording device further configured to determine start information which indicates a first data item recorded during a storage mode and end information which indicates a last data item recorded in the storage mode.

5. The information processing apparatus according to claim 4, wherein the start information further indicates whether the data item recorded during the storage mode is the first data item or is a second or subsequent data item.

6. The information processing apparatus according to claim 4, wherein the end information further indicates whether the data item recorded during the storage mode is the last data item or is a previous data item.

7. The information processing apparatus according to claim 4, wherein the end information is recorded when a signal of the measured position information from an antenna of the information processing apparatus is ended.

8. The information processing apparatus according to claim 1, wherein the measured position time information is measured independently from the image time information.

9. The information processing apparatus according to claim 1, wherein the data items including the measured position information and the position time information are obtained by a global positioning unit (GPS).

10. An information processing method, implemented on an information processing apparatus, comprising:
storing, in a storing device, data items which include measured position information in association with position time information at which the measured position information is obtained, wherein the measured position information and the position time information are obtained at predetermined intervals;
transferring, in a transfer device, the stored data items from the storing device to a recording device;
receiving and recording, in the recording device, the data items from the storing device, and receiving and recording image data from an external imaging device, the image data including image time information indicating a time of acquiring the image data at the external imaging device; and
comparing, in a matching unit, the image time information included in the image data with the position time information included in the data items,
wherein when the compared image time information and position time information match, a position of the external imaging device at the time of acquiring the image data is estimated on the basis of a measured position information associated with the matching position time information, and when the compared image time information and position time information do not match, the position of the external imaging device at the time of acquiring the image data is estimated on the basis of at least two measured position information associated with at least two respective position time information corresponding to the image time information.

11. A non-transitory computer readable storage medium having instructions recorded thereon for causing a computer to execute a method comprising:
storing in a storing device data items which include measured position information in association with position time information at which the measured position information is obtained, wherein the measured position information and the position time information are obtained at predetermined intervals;
transferring, in a transfer device, the stored data items from the storing device to a recording device;
receiving and recording, in the recording device, the data items from the storing device, and receiving and recording image data from an external imaging device, the image data including image time information indicating a time of acquiring the image data at the external imaging device; and
comparing, in a matching unit, the image time information included in the image data with the position time information included in the data items,
wherein when the compared image time information and position time information match, a position of the external imaging device at the time of acquiring the image data is estimated on the basis of a measured position information associated with the matching position time information, and when the compared image time information and position time information do not match, the position of the external imaging device at the time of acquiring the image data is estimated on the basis of at least two measured position information associated with at least two respective position time information corresponding to the image time information.

12. An information processing apparatus comprising:
a storing device configured to store data items which include measured position information in association with position time information at which the measured position information is obtained, wherein the measured position information and the position time information are obtained at predetermined intervals; and a transferring device configured to transfer the stored data items from the storing device to a recording device; wherein the recording device is configured to receive and record the data items from the storing device, and to receive and record image data from an external imaging device, the image data including image time information indicating a time of acquiring the image data at the external imaging device, and wherein the image time information included in the image data is compared with the position time information included in the data items, when the compared image time information and position time information match, a position of the external imaging device at the time of acquiring the image data is estimated on the basis of a measured position information associated with the matching position time information, and when the compared image time information and position time information do not match, the position of the external imaging device at the time of acquiring the image data is estimated on the basis of at least two measured position information associated with at least two respective position time information corresponding to the image time information.

13. An information processing apparatus comprising:
a recording device configured to receive and record data items from a storing device, and to receive and record image data from an external imaging device, the image data including image time information indicating a time of acquiring the image data at the external imaging device; and a matching unit configured to compare the image time information included in the image data with a position time information included in the data items, wherein the storing device is configured to store the data items which include measured position information in association with the position time information at which the measured position information is obtained, the measured position information and the position time information are obtained at predetermined intervals and the stored data items are transferred from the storing device to the recording device, and wherein when the compared image time information and position time information match, a position of the external imaging device at the time of acquiring the image data is estimated on the basis of a measured position information associated with the matching position time information, and when the compared image time information and position time information do not match, the position of the external imaging device at the time of acquiring the image data is estimated on the basis of at least two measured position information associated with at least two respective position time information corresponding to the image time information.

* * * * *